US010240969B2

(12) United States Patent
Rego

(10) Patent No.: US 10,240,969 B2
(45) Date of Patent: Mar. 26, 2019

(54) PORTAFILTER AND GROUNDS WEIGHING PLATFORM SYSTEM AND METHODS OF USE

(71) Applicant: Francisco Alfredo Rego, Sun Valley, ID (US)

(72) Inventor: Francisco Alfredo Rego, Sun Valley, ID (US)

(73) Assignee: Mazzer Luigi S.p.A., Scorzé (IT)

( * ) Notice: Subject to any disclaimer, the term of this patent is extended or adjusted under 35 U.S.C. 154(b) by 1112 days.

(21) Appl. No.: 14/513,139

(22) Filed: Oct. 13, 2014

(65) Prior Publication Data

US 2015/0136496 A1    May 21, 2015

Related U.S. Application Data

(63) Continuation-in-part of application No. 14/165,404, filed on Jan. 27, 2014, now abandoned, which is a
(Continued)

(51) Int. Cl.
*A47J 31/40* (2006.01)
*A47J 42/42* (2006.01)
(Continued)

(52) U.S. Cl.
CPC ............ *G01G 19/52* (2013.01); *A47J 31/404* (2013.01); *A47J 42/40* (2013.01); *A47J 42/44* (2013.01); *G01G 23/005* (2013.01); *B02C 19/00* (2013.01)

(58) Field of Classification Search
CPC ..... G01G 19/52; G01G 23/005; A47J 31/404; A47J 42/40; A47J 42/44; A47J 42/38; A47J 42/50; B02C 19/00
See application file for complete search history.

(56) References Cited

U.S. PATENT DOCUMENTS 4,319,650 A * 3/1982 Brendel ............... G01G 3/1412
177/156
4,911,369 A    3/1990 Bunn
(Continued)

FOREIGN PATENT DOCUMENTS

EP    1659378 A2    5/2006
EP    1735409 B1    11/2011
(Continued)

OTHER PUBLICATIONS

Prince, Weight Based Grinding Becomes Reality: Baratza's New Thing (Exclusive), http://coffeegeek.com/opinions/coffeeatthernomnet/ Apr. 19, 2011, Apr. 18, 2011, pp. 1-9.
(Continued)

*Primary Examiner* — Randy Gibson
(74) *Attorney, Agent, or Firm* — Themis Law

(57) ABSTRACT

A device with weighing capability (or "scale feature") and also anvil capability (or "tapping feature") allows accurate and precise filling of an espresso portafilter with coffee grounds for use in beverage preparation. Some versions switch between a protected mode for anvil use, and a weighing mode for accurate weighing of the portafilter and its grounds, by pivoting the entire load cell into and out of a protected location wherein tapping/shocks do not flex/strain the load cell free end. In other versions, one or more stop(s)/limit(s) are near the load cell free end or associated elements, and the free end/elements move during said tapping/shocks but only to the stop(s)/limit(s), corresponding to a safe amount of strain for the load cell. Also, this way, weighing the portafilter and its contents may continue between taps without switching to a separate protected mode.

23 Claims, 20 Drawing Sheets

Related U.S. Application Data continuation-in-part of application No. PCT/US2011/045507, filed on Jul. 27, 2011, and a continuation-in-part of application No. 14/110,359, filed as application No. PCT/US2011/031260 on Apr. 5, 2011, now abandoned, application No. 14/513,139, which is a continuation-in-part of application No. PCT/US2014/045626, filed on Jul. 7, 2014.

(60) Provisional application No. 61/890,133, filed on Oct. 11, 2013, provisional application No. 62/008,429, filed on Jun. 5, 2014, provisional application No. 61/843,357, filed on Jul. 6, 2013, provisional application No. 61/890,133, filed on Oct. 11, 2013.

(51) Int. Cl.
| | |
|---|---|
| *G01G 19/52* | (2006.01) |
| *G01G 23/02* | (2006.01) |
| *B02C 19/00* | (2006.01) |
| *G01G 23/00* | (2006.01) |
| *A47J 42/40* | (2006.01) |
| *A47J 42/44* | (2006.01) |

(56) References Cited

U.S. PATENT DOCUMENTS

| | | | |
|---|---|---|---|
| 5,265,517 A | 11/1993 | Gilbert | |
| 5,319,161 A * | 6/1994 | Miller | G01G 23/005 |
| | | | 177/154 |
| 5,340,597 A | 8/1994 | Gilbert | |
| 5,386,944 A | 2/1995 | Knepler et al. | |
| 5,522,556 A | 6/1996 | Knepler et al. | |
| 6,783,089 B2 * | 8/2004 | Lassota | A47J 31/42 |
| | | | 241/100 |
| 6,948,668 B2 | 9/2005 | Mazzer | |
| 7,223,427 B2 | 5/2007 | Knepler | |
| 7,337,714 B2 | 3/2008 | Mazzer | |
| 8,226,020 B2 | 7/2012 | Mazzer | |
| 8,279,546 B1 | 10/2012 | Mazzer | |
| 2003/0025012 A1 * | 2/2003 | Lassota | A47J 31/42 |
| | | | 241/34 |
| 2003/0110953 A1 * | 6/2003 | Mazzer | A47J 42/40 |
| | | | 99/286 |
| 2003/0129286 A1 | 7/2003 | Knepler | |
| 2003/0167928 A1 | 9/2003 | Mulle et al. | |
| 2007/0063079 A1 * | 3/2007 | Ford | A47J 31/42 |
| | | | 241/30 |
| 2010/0011975 A1 | 1/2010 | Mazzer | |
| 2010/0080886 A1 | 4/2010 | Hourizadeh | |
| 2012/0156344 A1 | 6/2012 | Studor et al. | |
| 2013/0001339 A1 | 1/2013 | Hoare et al. | |
| 2014/0123857 A1 | 5/2014 | Rego | |
| 2014/0203118 A1 * | 7/2014 | Rego | A47J 42/44 |
| | | | 241/6 |
| 2016/0374513 A1 * | 12/2016 | Rego | A47J 42/40 |
| | | | 99/280 |
| 2017/0138782 A1 * | 5/2017 | Beber | A47J 42/38 |

FOREIGN PATENT DOCUMENTS

| | | | |
|---|---|---|---|
| EP | 2391250 A1 | 12/2011 | |
| GB | 594414 A | 11/1947 | |
| WO | 2001023095 A1 | 4/2001 | |
| WO | 2005063100 A1 | 7/2005 | |
| WO | 2010131242 A1 | 11/2010 | |
| WO | 2012138327 A1 | 10/2012 | |
| WO | 2013015801 A1 | 1/2013 | |
| WO | 2015006244 A1 | 1/2015 | |

OTHER PUBLICATIONS

PCT International Search Report and the Written Opinion for PCT/US2011/031260, Applicant: Adager Corporation, dated Jun. 20, 2011.

PCT International Search Report and the Written Opinion for PCT/US2011/045507, Applicant: Adager Corporation, dated Jan. 10, 2012.

PCT International Search Report and the Written Opinion for PCT/US2014/045626, Applicant: Adager Corporation, dated Sep. 5, 2014.

Supplementary European Search Report, Application No. EP 11 86 2849, derived from PCT/US2011/031260, Applicant: Adager Corporation, date of completion: Jul. 28, 2014.

* cited by examiner

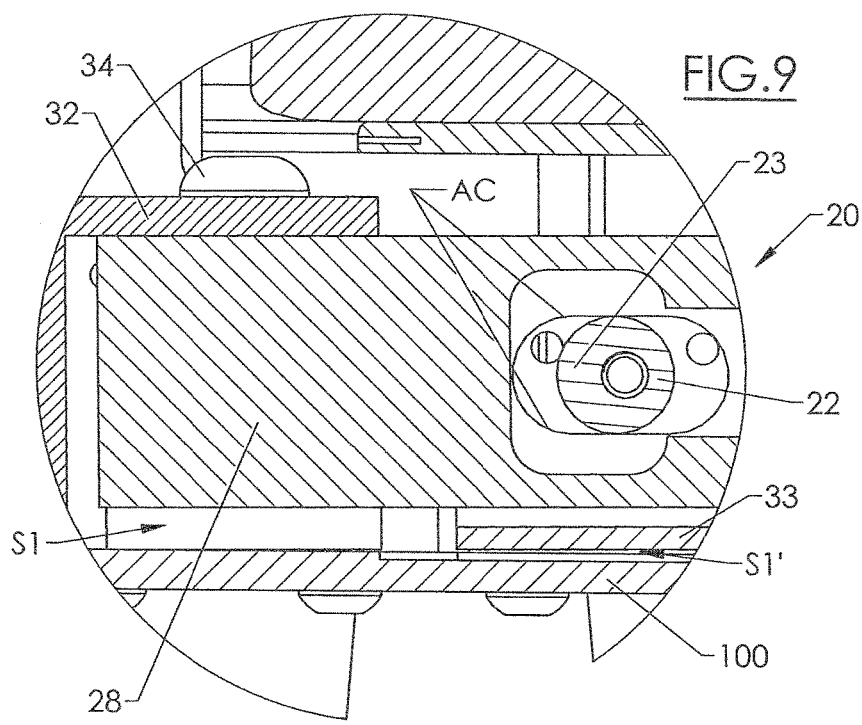
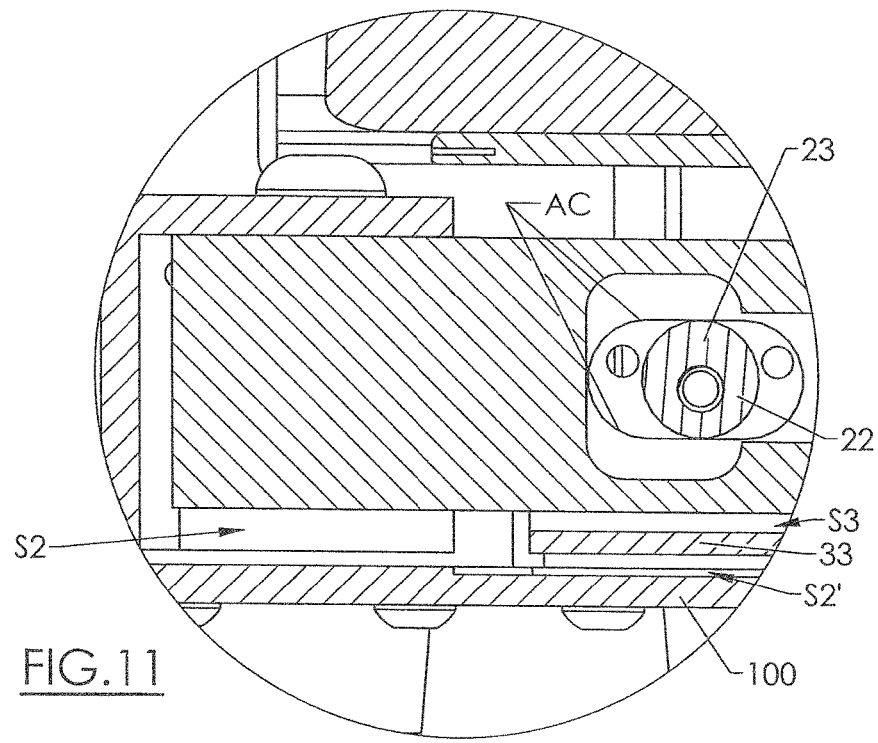

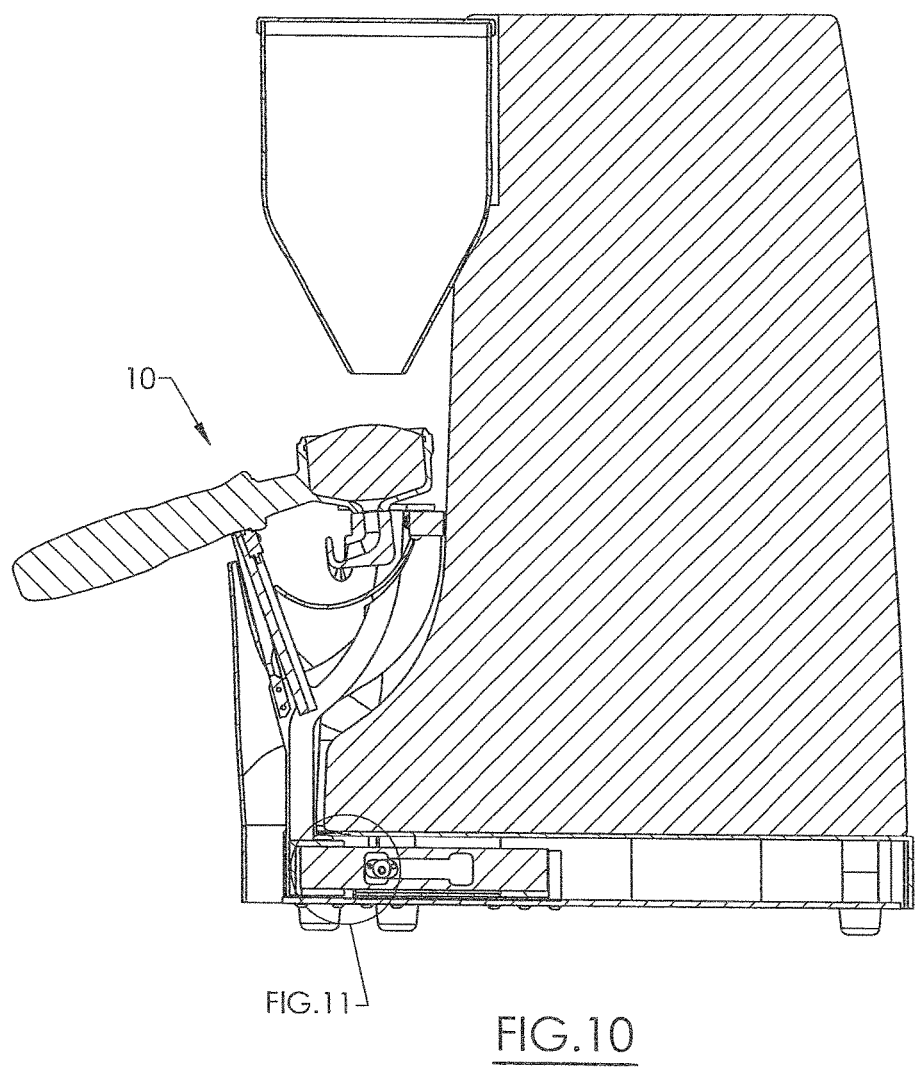

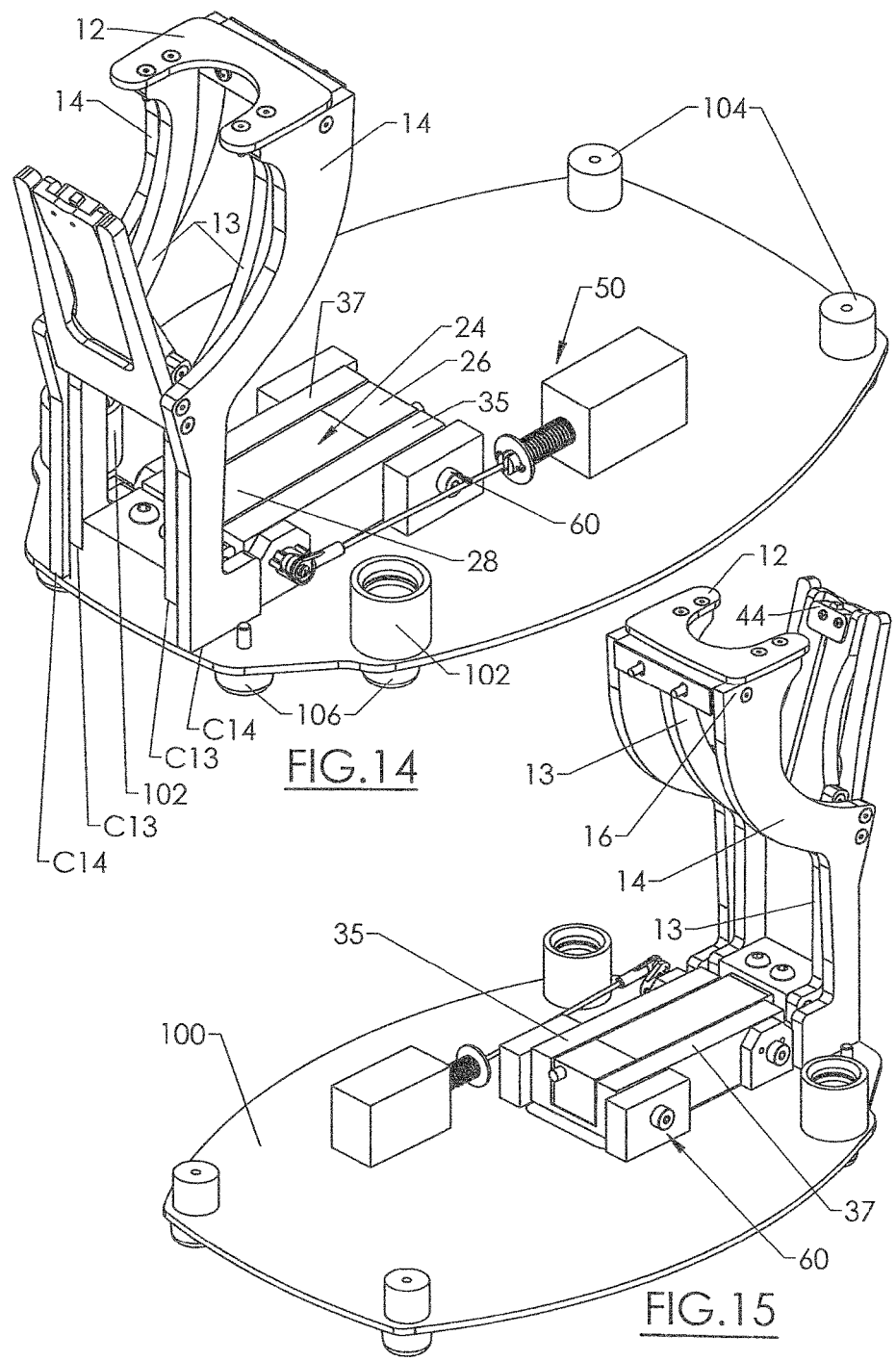

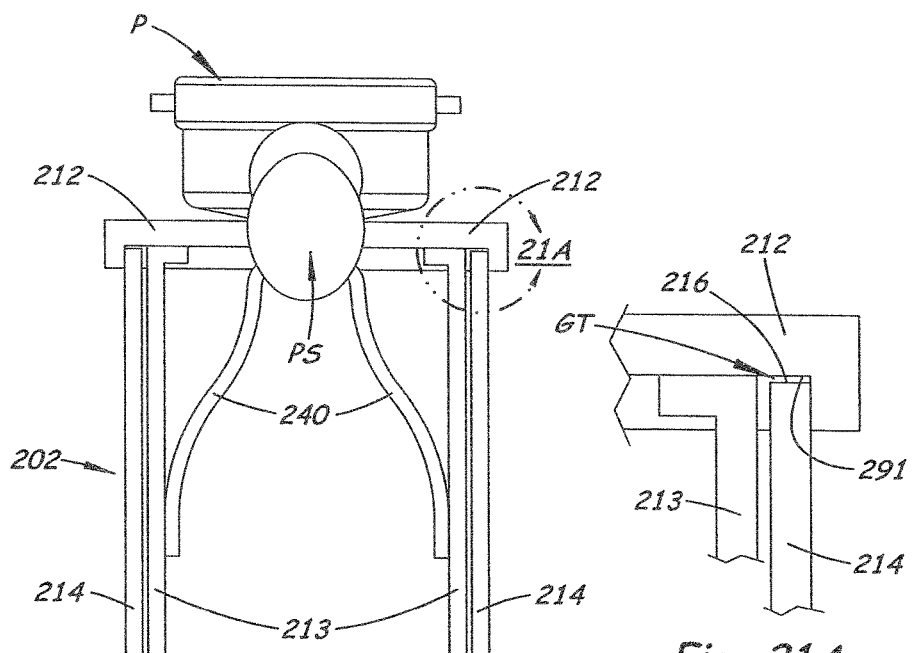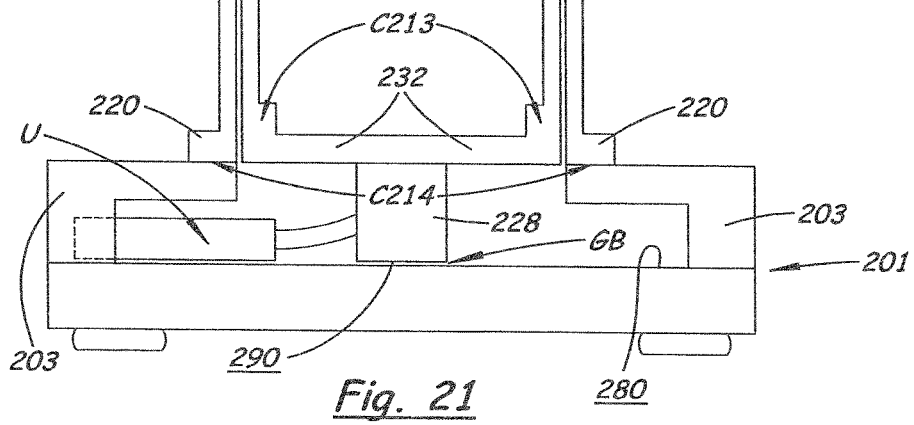
Fig. 21
Fig. 21A

PORTAFILTER AND GROUNDS WEIGHING PLATFORM SYSTEM AND METHODS OF USE

DESCRIPTION

This application claims benefit of Provisional Application Ser. No. 61/890,133 filed Oct. 11, 2013, and Ser. No. 62/008,429 filed Jun. 5, 2014; is a continuation-in-part of PCT Application PCT/US2014/45626 filed on Jul. 7, 2014 claiming priority of Provisional Application Ser. No. 61/843,357 filed Jul. 6, 2013, Ser. No. 61/890,133 filed Oct. 11, 2013, and Ser. No. 62/008,429 filed Jun. 5, 2014; and is a continuation-in-part of U.S. Non-Provisional Ser. No. 14/165,404, filed on Jan. 27, 2014 as a continuation-in-part of PCT Application PCT/US2011/45507 filed Jul. 27, 2011 and as a continuation-in-part of U.S. Non-Provisional Ser. No. 14/110,359 filed Oct. 7, 2013, which is a 371 National Entry of PCT/US2011/31260 filed Apr. 5, 2011; wherein the disclosures of all of the above-listed PCT Applications, Provisional Applications, and Non-Provisional Applications are incorporated herein by this reference.

BACKGROUND

Field of the Invention

This technology relates generally to weighing systems for espresso or other coffee grounds. More specifically, the preferred embodiments relate to systems for connection to, or use with, a bean grinding machine, that conveniently support an espresso portafilter hands-free, and that also very accurately weigh the portafilter containing espresso coffee grounds.

Related Art

Coffee bean grinders and espresso portafilter apparatus and methods are known, with examples being described in PCT/US2011/31260 and PCT/US2011/45507, which documents are both incorporated in their entirety by this reference. Accuracy of weighing espresso grounds is extremely important to many baristas and their customers, and this is an area of espresso technology that has been problematic. Baristas tend to repeatedly tap the portafilter to settle the grounds inside the cup. Many baristas perform a process, of repeated tapping, filling, and weighing the portafilter with its contained grounds, multiple times to optimize the amount and packing of the grounds in order to optimize espresso making process and flavor. Typically, however, the scale is distant from the grinder, for example, several feet away, so these processes require repeated transport of the portafilter from the grinder to the scale and back. Also, the scale is prone to being bumped and moved, and frequently does not remain accurate even if it is a quality scale to start. If the barista taps the portafilter against the scale, damage to, and inaccuracy of, the scale is accelerated. Also, the barista must hold the portafilter handle the entire time the portafilter is being filled, because the basket only is supported under the grinder outlet, for example, by a conventional support fork. The conventional grinding and weighing process is therefore slow, cumbersome, messy, and/or inaccurate.

Many baristas' perform said tapping of the portafilter against the grinder or adjacent equipment, and this practice teaches against and away from placing a conventional scale at or near the grinder. Conventional scales' load cells are very prone to damage from impact and shock, and the barista's tapping on a conventional scale would act like a heavy weight being suddenly and repeatedly placed on the scale, and that shock would cause damage to the load cell and relatively quickly make the load cell inaccurate or inoperable. Therefore, associating a scale with a grinder is problematic and, to date, Applicant is unaware of any scale system near a grinder that is efficient, durable, and accurate.

SUMMARY

The invention comprises a platform device that is placeable near or against, and/or connectable to, a coffee grinder, which platform device comprises a basket-support portion for supporting a portafilter basket directly underneath the outlet of the grinder for filling of the basket. The platform device may further comprise a handle-support portion, which is spaced from said basket-support portion, and which receives the handle of the portafilter for hands-free resting of the portafilter on the platform device. In the hands-free position, the portafilter is cradled or otherwise retained from tipping or falling, and a weighing system of the platform device weighs the portafilter, and its contents if any. Certain embodiments of the platform device comprise adaptations that provide automatic weighing of the portafilter (with contents, if any) as soon as a user rests the portafilter hands-free on the platform device. Certain embodiments of the platform device comprise adaptations that protect the weighing system, and especially a load cell of the weighing system, to limit or eliminate damage from the shock of portafilter tapping, or from other impact against the platform device. Therefore, the process grinding of beans, dispensing of grounds from the grinder into the portafilter basket, tapping the portafilter to settle the grounds, and then weighing the portafilter (including any contents) and/or additional filling, and the repeated performance of this process or various combinations and ordering of these process steps, may proceed efficiently and reliably, at or very close to the grinder, with very accurate weight readings even after many cycles of the process/steps. Certain embodiments are protected from, or limited in regards to, load cell damage caused by vibration, tapping, or other impacts that are on or near the load cell apparatus, or that may be transmitted from equipment mechanically connected to the load cell and/or from the grinder.

Certain embodiments of the invention comprise a device that has a weighing capability provided by a "scale feature" or "scale assembly", and also an anvil capability, for allowing and withstanding tapping and other shocks, provided by a "tapping feature" or "anvil assembly". The "tapping feature" or "anvil assembly" is provided by preventing excess movement of the load cell free end, either by moving the entire load cell system to a limited- or no-further-movement position, or by leaving the free end of the load cell free to move but only up to a safe limit. These capabilities/features are adaptations that provide accurate, fast, efficient, and clean/neat filling of an espresso portafilter with coffee grounds for use in espresso beverage preparation, while protecting a high quality load cell that enables accurate weight measurements In certain embodiments, the protection of a high-quality load cell apparatus is done by moving/locking/latching the load cell into a protected position, during some or preferably all times that the device is not weighing the portafilter with its contents if any. Preferably, in such embodiments, the load cell and associated elements that transmit force to the load cell, are moved as a whole to (and therefore "latched" or "locked" in) a position or orientation wherein tapping or other shocks, even directly on said elements, cannot move said associated elements or the any portion of the load cell any further. Thus, said associated elements will not pass/ transmit loading to the free end of the load cell. The locking/latching may be done by switching between the protected mode and the weighing mode, with certain embodiments comprising switching that results from a movement of the user during said process rather than a separate motion that takes the user's hand/fingers away from said process. In certain embodiments, the device is adapted so that the switching to weighing mode occurs automatically when the user rests the portafilter hands-free on the platform device. In certain embodiments, the switching back to protected mode occurs automatically when the user lifts the portafilter, or a portion of the portafilter, off of the platform device, as said lifting can mean that tapping is again a possibility.

In certain embodiments, the protection of a high-quality load cell apparatus is done instead by leaving the load cell, and the associated elements that transmit force/load to the load cell, in a position that is operable for weighing, but also by placing a limit(s) on the load cell movement, wherein the limit is a maximum safe distance/amount of movement/ strain. This way, tapping or other shock will typically force the load cell to the maximum safe strain, but not beyond. However, weighing of the portafilter (and contents, if any) will typically force the load cell to intermediate distance(s)/ amount(s) of movement, that is, distance(s)/movement(s) that are between the location wherein the load cell rests when the portafilter is lifted entirely off the platform and the location of the limit. Therefore, the load cell, and the associated elements that transmit load/force to the load cell, may safely move within a range of positions that are all non-damaging positions, preferably during all times and steps of the filling and weighing process, except that, if greater forces/shocks such as tapping occur, the load cell safely reaches the limit and moves no further.

BRIEF DESCRIPTION OF THE DRAWINGS

FIG. 9 is a detail view derived from FIG. 8, showing one embodiment of a cam system that may pivot the cradled load cell into and out of the protected mode, wherein this view shows the cam rotated to put the device in the protected mode.

FIG. 10 is a detail, cross-sectional view of the grinder and device of FIG. 1, viewed along the line 10-10 in FIG. 1, wherein the portafilter handle is lowered to switch the device into weighing mode wherein loading is passed to the load cell.

FIG. 11 is an enlarged detail view from FIG. 10, wherein the cam is rotated upward/rearward, to lift the entire load cell system (load cell and its housing/cradle, the fork-arm and the fork-plate), for weighing.

FIGS. 14 and 15 are front (closest to the barista) and rear (away from the barista) isometric views of the fully assembled anvil and scale mechanism of FIG. 1, shown in the non-weighing, protected state.

FIG. 21 is a schematic view of the embodiment of FIG. 19, shown connected to its base and with a portafilter resting on the front and rear portions of the support system.

FIG. 21A is an enlarged detail view of the portion circled in FIG. 21.

DETAILED DESCRIPTION

Figure 1:
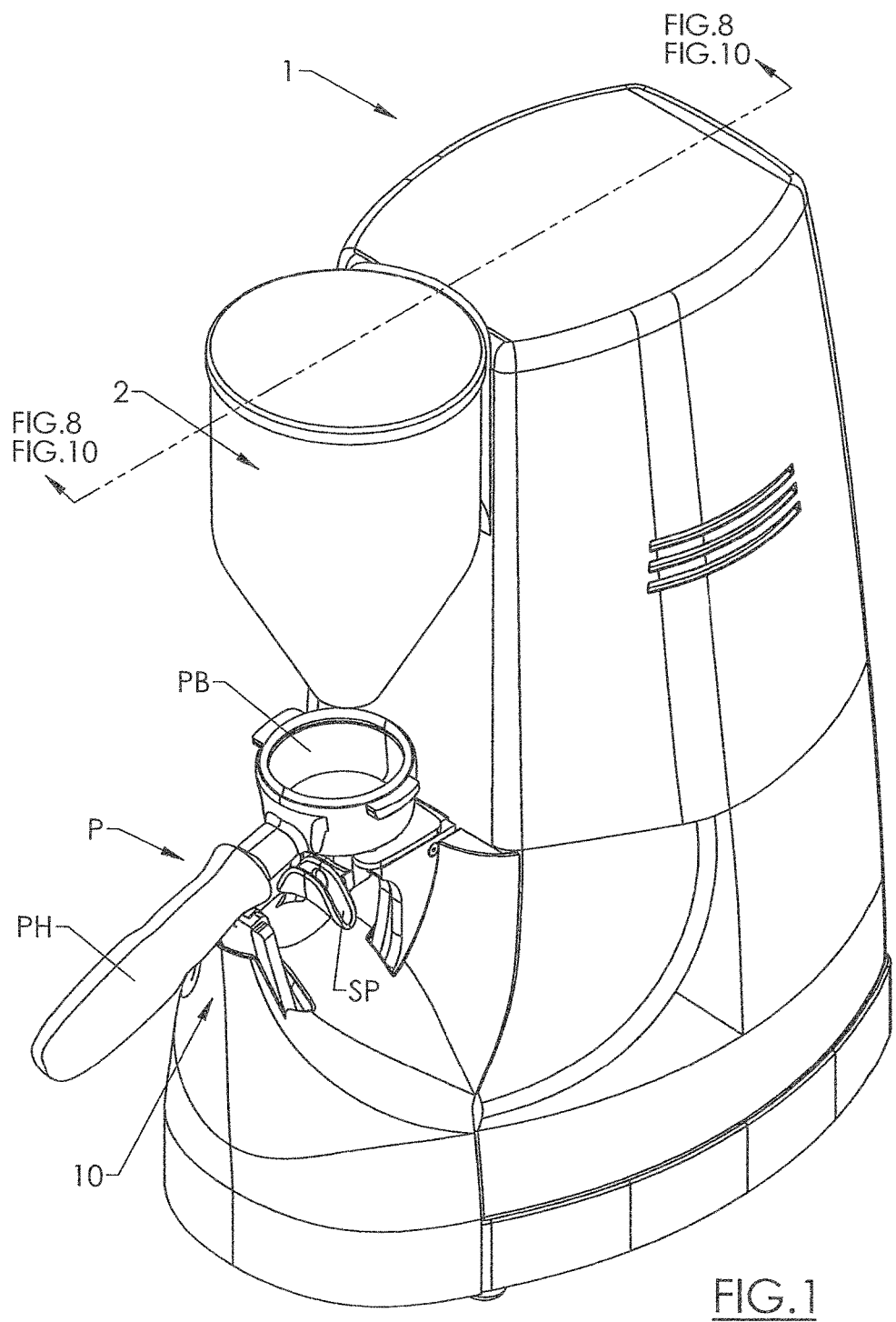
FIG. 1 is an isometric view of an embodiment of an example coffee grinder, and one, but not the only, embodiment of a portafilter platform device wherein the platform device is adapted to be switched to move into and out of a load-cell protected position. This view shows the device with an empty portafilter in place, without the user holding the portafilter. Also seen in this view is the cross section line showing the general location of the cross-sections of FIGS. 8-11, wherein the portafilter handle is raised in FIGS. 8 and 9 because the user (not shown) is holding the handle, and wherein the portafilter handle is resting in FIGS. 10 and 11 because the user has set the handle back on the handle-rest.

Definitions and Abbreviations:

A "barista" is a person who prepares espresso coffee, as well as derivative beverages such as a macchiato, cappuccino, or latte.

An "espresso coffee grinder" ("grinder") converts roasted coffee beans into ground coffee, which may be used for preparing coffee, espresso, or derivative beverages. The resulting ground coffee goes into the basket of a "portafilter" for preparation of espresso and derivative beverages. Portafilters are known in the art of conventional espresso preparation.

The "portafilter" then goes into an espresso machine, which forces hot water under high pressure through the portafilter's basket to produce espresso coffee (typically, "espresso", "espresso shots" or "espresso drinks").

Reference to the Drawings and General Discussion of Objects and Benefits:

Referring to the Figures, several but not the only embodiments are shown. The drawings, in view of the text herein, will allow one of average skill to make and use the invention. Many other embodiments will be apparent to one of skill after viewing this document, and such embodiments are included in the broad scope of this invention.

High-quality espresso machines have advanced in the last decade or so, and they provide consistently precise pressure and temperature. The Inventor(s)/Applicant(s) believe that these improved espresso machines now may be accurate and consistent enough that the next development should be ensuring that precisely the desired amount of grounds is provided in the portafilter. Certain high-quality espresso grinders have attempted to deliver consistent amounts of ground coffee using methods based on the length of time it takes to grind and/or based on the volume of the resulting ground coffee. However, neither of these methods is accurate.

Certain embodiments of the disclosed technology are called "ADAGER'S SMART PORTAFILTER PLATFORM"™ (or "ADAGER'S SPP"™) and are specifically designed to help the barista dispense a precise mass of ground coffee from an espresso grinder into an espresso portafilter's basket. This may be done by use of a highly-accurate load cell weighing system that is associated with and preferably connected to the grinder, but that is protected from damaging vibration and other forces. In certain embodiments, the weighing system is protected and in an off/locked configuration, during all the steps of the process until the potentially-damaging vibrations and tapping have stopped and the user is ready to weight the portafilter. Then, the user's actions cause the weighing system to move into an on/unlocked configuration, for weighing of the portafilter and its grounds. In certain other embodiments, the weighing system is protected, while remaining in an "on" configuration, because a limit is placed/provided on the maximum amount the free end of the load cell can move.

Load cells are portrayed in the figures, but without detailing the strain gages and associated wiring and wiring connectors. A conventional, high-quality load cell system may be used, and said strain gages/circuitry/wiring and its placement and operation will be understood by those of skill in the art after reading and viewing this disclosure.

Likewise, other wiring and circuity for the invented device and/or the grinder is not detailed in the figures, but will be understood by those of skill in the art after reading and viewing this disclosure. In embodiments with switches, conventional switches may be used in the locations and for the purposes taught by this disclosure. For example, in certain embodiments that have a "switch on and off" load cell protection and weighing system, a conventional switch may be used in a position on the handle-support portion of the platform, so that the handle of the portafilter pressing/resting on the switch will operate the switch and the switch will signal/actuate the solenoid.

Certain embodiments may be described as having several unique characteristics that include one or more, or all, of the following:
1) The preferred devices use an accurate and precise scientific scale to measure the weight of the ground coffee. This is far superior to methods based on: a) the length of time it takes to grind, or b) the volume of the resulting ground coffee.
2) The preferred devices hold any portafilter (bottomless, double-spouted, single-spouted) in a secure and stable way. The preferred devices are special-purpose scale systems that have been designed exclusively for portafilters and methods that will lead to efficient, accurate, and professional portafilter and grounds preparation.
3) It is important to note that an accurate and precise scientific scale (available commercially) is a very delicate instrument that can be easily damaged by tapping and/or banging. Therefore, the preferred devices are adapted to allow the barista to tap (even to bang) the portafilter onto/against the devices. Certain embodiments, that are switchable to a protection configuration, act as a rigid anvil that provides a solid and reassuring feedback during normal (and even abusive) barista actions which are intended to distribute and settle ground coffee into the portafilter's basket. With other embodiments, which remain in weighing mode but that provide a safe limit(s)

for load cell movement, baristas may be easily trained and reassured that their efficient and quick actions will not damage the load cell.
4) The barista doesn't waste time and effort moving the portafilter back and forth between the grinder and an external scale and/or a separate tapping block.
5) The preferred devices are specifically designed to protect the scientific scale during the normal (and even abusive) performance of the barista's routine while filling, packing, and tapping a portafilter with ground coffee.
6) The preferred devices may in certain embodiments control the grinder, so that the grinder dispenses a desired weight of ground coffee into the portafilter in one or more portions. In embodiments with said control, the device executes this function accurately, precisely, and consistently. Certain embodiments may include software, firmware, and hardware to implement mathematical algorithms that track and predict the grinder's production (and delivery) of ground coffee.
7) The preferred device may be protected by an outside shell, or "housing", that matches and complements the various sizes and shapes of all supported grinders. Besides the obvious aesthetic value of this shell, there is an important functional attribute; the shell's preferred shape, for example a hyperbolic paraboloid shape, serves to control the flow of stray coffee grounds so that they don't interfere with the accurate and precise weight measurements performed by the scale. Most preferably, the shell is shaped so that coffee grounds, if they spill from the grinder, will flow down off of the platform device to the table or tray below, so they are not weighed with the portafilter and its basket contents.

It may be understood from this disclosure and the drawings that the disclosed device is adapted for significantly-improved methods of espresso/coffee grounds preparation and/or beverage preparation. In certain embodiments, the barista uses a previously-tared portafilter and a previously-specified weight of grounds (for example, from the barista's experience, from company specifications, or other data), and fills the portafilter to approximately that weight, taps the portafilter as desired, and weighs the portafilter plus grounds using the disclosed device. The barista may repeat the process, adding incremental amounts of grounds, by a manually-operated grinder switch for example, until the desired weight of grounds in the portafilter is achieved. The disclosed device allows a very high-quality scale/load cell to be used, without the normal vibrations, tapping, or other impacts harming the scale/load cell.

In certain embodiments, the device is linked to the performance of the grinder, so that more of the steps are done automatically with hardware, firmware and/or software operatively connected to the grinder and the scale system. In certain embodiments, therefore, the barista's routine workflow may evolve to one simple action that commands the grinder to start grinding and dispensing ground coffee into the portafilter and to stop when the desired weight of grounds is in the portafilter. For example, the user may rest the portafilter on the device and the starting and/or stopping of grinding and/or associated weighing may be done by operative connection and cooperation of the weighing system and the grinder, by means of said hardware, firmware and/or software provided in the system. The device could be adapted/programmed to automatically stop the grinder when the portafilter reaches the specified net target weight of ground coffee. The starting of the multi-step process may be done by the user by a hand-operated switch, for example, or may automatically start when the user rests the portafilter in the proper resting location on the device, for example. There may be multiple resting locations or sequences of steps that both protect the load cell but also unlock it during certain stages of the process to allow the weighing. In some embodiments, the grinding is done (even if several stages/periods of grinding are needed) while the scale/load-cell is locked/protected, and in some embodiments, the grinding is done with the load-cell unprotected because the grinding is not so jolting that it will damage the load-cell. Certain embodiments may remember the tare weight of the given portafilter as well as the barista's desired weight of ground coffee that the grinder must dispense into the portafilter.

Certain embodiments include digital read-out of weights and/or other data and words that help in the taring and weighing process. It may be noted that the load cell measurements may be transmitted by conventional means out from the load cell to such a read-out, for example, by wiring from the load cell circuity/strain gages.

Certain embodiments may have detachable/connectable/changeable input stations for different baristas or different beans, etc., so that the system may be adapted for the particular, precise and accurate needs of the baristas, company, and/or customers.

Certain embodiments comprise adaptations for communication, control, and read-out between the coffee grinder and/or weighing system and a device such as a smart phone, personal digital device, electronic notebook or tablet, and/or computer. This may be accomplished, for example, by wireless, Bluetooth or other communication means, and may include control of the grinder itself in certain embodiments.

When changing to another portafilter, including a portafilter of a different model or manufacturer, the barista may do a simple and intuitive tare operation on/with the device. When changing the desired weight of grounds (or portafilter plus grounds), the barista may specify the new desired weight, again using a simple and intuitive interface provided with certain embodiments of the device (including the choice of a previously specified weight).

In certain embodiments, the device may comprise, consist essentially of, or consist of one or more, or all, of the following:
A single device with two distinct and mutually exclusive functions, that is, weighing the portafilter and its contents by means of a scale, plus an anvil function (for the tapping/pounding to settle and evenly distribute the grounds) by means of moving the scale to a position where it does not move or flex upon said tapping/pounding. This may include:
a) An accurate and precise scientific-level scale system, specifically designed to:
  i) Hold a portafilter;
  ii) Complement a grinder's shape to create a functionally integrated unit that is aesthetically appealing;
  iii) Dynamically (and in real time, with direct feedback to the barista) measure the weight of the ground coffee that the grinder dispenses into the portafilter;
b) A solid-feeling platform portion ("anvil") on which the barista taps the portafilter, so that the barista does not have to worry about damaging the delicate scale, or move the portafilter away from the grinder and/or the scale for weighing/tapping, or move the portafilter back to the grinder to continue dispensing more ground coffee, if necessary.

In certain embodiments, the device may comprise, consist essentially of, or consist of one or more, or all, of the following:
A single device with two functions, that is, weighing the portafilter and its contents by means of a scale, while also providing an anvil function (for the tapping/pounding to settle and evenly distribute the grounds) without switching off the weighing function. This may include:

a) An accurate and precise scientific-level scale system, specifically designed to:
  i) Hold a portafilter;
  ii) Complement a grinder's shape to create a functionally integrated unit that is aesthetically appealing;
  iii) Dynamically (and in real time, with direct feedback to the barista) measure the weight of the ground coffee that the grinder dispenses into the portafilter;
b) A platform portion on which the barista taps the portafilter, without switching off the scale or moving the scale elements to a sheltered/protected position before tapping, and without moving the portafilter away from the grinder to a distant tapping location and then back to the grinder to dispense more ground coffee, if necessary.

In certain embodiments, the disclosed methods may be disclose comprise, consist essentially of, or consist of one or more, or all, of the following:

A method to control a grinder, so that the grinder dispenses a desired weight of ground coffee into the portafilter. This method may include:
a) A method to specify (and display) the desired weight.
b) A method to command the grinder to start grinding and dispensing ground coffee.
c) A method to stop the grinder when the portafilter reaches the specified target weight of ground coffee.

In certain embodiments, the disclosed device/methods may comprise, consist essentially of, or consist of one or more, or all, of the following:

A method to control the flow of stray coffee grounds so that they don't interfere with the accurate and precise weight measurements performed by the disclosed scale system. The scale system is preferably protected by an outside shell (housing) that matches and complements the various sizes and shapes of all supported grinders. Besides the aesthetic value of this shell, there is an important functional attribute that comprises the shell's hyperbolic paraboloid shape/surface, or other smoothly, downward-curved shape/surface, which causes stray coffee grounds from the grinder spout and the portafilter to fall down off of the platform device, for example, to the table or tray. This way, the stray grounds do not rest or cling outside the portafilter and on the platform device to interfere with the accurate and precise weight measurements performed by the scale.

Therefore, certain devices have an "automatic" method/action to switch between two mutually exclusive functions, that is, a weighing mode that is distinct and separate from a tapping mode. The "automatic" method/action may rely on the user's action, preferably part of the natural, smooth steps of professional performance. For example, the user may simply rest the handle back on the device and let go, to switch to the weighing mode. In alternative embodiments, the two functions (weighing and tapping) are always available and which function is used depends also on the user's action, that is, whether the user is tapping, or resting the portafilter hands-free on the platform device to obtain a weight reading.

The platform device is easily adaptable to fit various brands, kinds, sizes, and shapes of existing grinders. The barista or manager, for example, can easily install the device onto an existing grinder by removing the screws that attach the grinder's original portafilter fork and then screwing the scale-anvil structure to the grinder. The shell/housing covering the internal parts of the device is preferably designed to smoothly curve toward, smoothly abut against, and aesthetically conform to, the existing housing of the grinder, and so multiple platform device shells/housing designs may be desirable in order to match/mate with the shape and contour of different commercial grinders. Thus, the platform device may be designed to be easily integrated by various grinder manufacturers into their current and future grinder designs.

The grinder-control technology of certain embodiments of the platform device, wherein the platform device interfaces with and controls the grinder, may be designed to be easily adaptable to fit various brands, kinds, sizes, and shapes of existing grinders. The barista may easily install/integrate the platform device onto an existing grinder by following the specific instructions provided by Applicant(s) for each specific grinder. Alternatively, an authorized technician can perform the installation on-site, or the barista can ship the grinder to an authorized technical center. The preferred device will operate following UL standards, under UL certification. Embodiments comprising said grinder-control technology are also preferably designed to be easily integrated by various grinder manufacturers into their future grinder designs.

General Comments Regarding Preferred Embodiments:

The preferred embodiments are adapted to have a protected mode or position wherein the load cell is prevented from being excessively strained and therefore is protected from the resulting damage, and a weighing mode or position(s) wherein the portafilter and its contained grounds are accurately weighed. The protected mode/position may be achieved by moving the entire load cell, and associated elements that may strain the load cell, to a safe "shielded" position, or by limiting movement of the load cell free end by providing limit(s)/stop(s) near the free end or near said associated elements, but beyond (farther from) the safe positions wherein the free end may safely move (strain) during weighing. Certain of these embodiments may be called "switched" embodiments, as a solenoid or other electrically-switched actuator, or even a manual mechanical actuator, moves the load cell and associated elements, for example, through linear and/or rotational motion, to interfere with, or prevent, impacts and shocks from reaching the load cell. This may be done, for example, by pulling, pushing, swinging, or rotating at least some of the elements involved in the weighing step temporarily to a position wherein impacts and shocks are not able to "reach" the load cell, that is, not able to pass loading to the load cell free end. Then, when the source of impact or shock is removed/stopped, said elements may be returned to the weighing position for operation in the weighing step(s)/mode.

In other embodiments, which may be called "movement-stop" or "movement-limited" embodiments, the load cell and associated elements are not moved to a protected position prior to tapping or other impacts/shocks, but, rather, the load cell and associated elements stay in place during the tapping or other impacts/shocks, and said tapping, impacts, or shocks move the load cell and associated elements to abut against one or more stops/limits to prevent excessive load cell movement and the damage that could result. Thus, in effect, the user's tapping moves the load cell free end and associated elements to a protected position, but as soon as the tapping stops, said cell/elements will return to their original position, which is a ready-to-weigh or weighing positions. In such embodiments, the load cell/elements in the ready-to-weigh position or weighing positions are distanced from the stops/limits, and all positions that said cell/elements will typically move into, due to an empty portafilter or partially- or fully-filled portafilter being placed on said elements, are between the ready-to-weigh position and the maximum safe movement (stops/limits) position. Thus, weighing of the portafilter (whether empty or having contents) causes less movement of the load cell/elements than does tapping. Therefore, one may describe the stopped/limited position, as a configuration wherein the scale, particularly its load cell, is protected from harm that may happen due to tapping or other impacts, and wherein said cell/elements typically do not reach the stopped/limited position during normal weighing of the portafilter.

In the "switched embodiments", movement of the load cell system as a whole may be inherent in moving the load cell system between the protected and the unprotected positions, but this movement is a smooth and gradual, non-jarring movement, and will not damage the load cell. In the "movement-stop embodiments", movement of the load cell free end up to a certain distance, during the barista's tapping or other shocks, is inherent, and said tapping or shocks may be sudden, but the inventor has determined that placing limits on said "certain distance" is sufficient in certain embodiments to protect the load cell. One may understand, from this disclosure, that certain "switched embodiments" move the load cell system in advance of tapping, to a position wherein subsequent tapping/shocks on the fork-plate or associated structure will not move the load cell free end any further because the fork-plate is limited from further downward movement by the fork-plate being pulled/pushed against (and limited by) the stationary arm ("anvil") top ends. One may also understand, from this disclosure, that certain "movement-stop" embodiments" move the load cell free end during tapping, but only to the provided limits/stops, and then further movement is prevented. Thus, in both groups of embodiments, movement of the load cell is purposely done (upon switching) and then prevented (during tapping) or allowed but limited (during tapping), with the result of both being that the load cell free end does not strain in any event beyond what is considered a safe amount. It may be noted that, in the "movement-stop" embodiments, the load cell movement caused during tapping may be detected and differentiated from the load cell readings during weighing of the portafilter; in other words, readings or data from the load cell during tapping may be accounted for (for example, ignored or deleted) by the software/programming associated with the platform device, for example, software/programming that records, transmits, and/or interprets weight and/or other information to the grinder, a display, or other data or control systems.

In "movement-stop" embodiments, the inventor has determined that the limits/stops may be placed/provided to allow the movement in response to the tapping/shocks to be greater than the typical and expected amount of movement during weighing of the loaded portafilter. Therefore, the limits/stops typically and preferably do not need to be moved/removed prior to weighing of the portafilter or the loaded portafilter. Thus, one may understand that there are limits/stops that allow (are not reached during) weighing in the context of the portafilter and its contents, but that are reached during tapping/shocks equaling forces greater than the weighing. In other words, the loading/forces involved in typical tapping/shocks caused by a barista's actions or other actions of grinding or accidents will be greater than those typically caused by weighing the portafilter and its contents, so the system may be designed to protect from tapping/shocks but also to weigh without switching between separate protected and weighing modes.

Referring Specifically to FIGS. 1-18:

The platform device is placed immediately adjacent to or against (touching), and preferably connected to, the grinder, with its portafilter support system in front of the grinder (nearer the barista). The portafilter support system comprises a rearward support portion positioned directly below the grinder dispensing nozzle or other outlet. The basket is placed on the rearward support portion for filling the basket with freshly-ground coffee, typically while the user holds the handle of the portafilter. This rearward support portion (or basket support portion) may be a replacement for a conventional "fork" on which the basket is conventionally placed during use of a conventional grinder. In the protected mode of this type of embodiment, the portafilter may be tapped/hit against the rearward support portion, with little and preferably no transfer of force/load to the load cell. Once switched to weighing mode, for example by the user resting the handle of the portafilter forward on the forward support portion (or handle support portion) of the portafilter support system of the device, the load cell protection device will be unlatched/unlocked and the weight of the portafilter will be measured. This unlatching/unlocking is preferably done by the user resting the entire portafilter on the platform device and letting go of the portafilter so that the portafilter rests "hands-free. This letting go will ensure that the user will no longer tap or hit the portafilter against any structure that might transfer damaging impact/shock to the load cell, and it places the handle preferably in a location or on a switch that affects switching of the device to weighing mode. Note that, the term rearward support portion is used herein, and may be various support plates or brackets or holders, but the preferred rearward support portion is a "support plate", which may be a generally flat/planar "fork-plate" having an opening or gap generally in a central region to receive the liquid spout of the portafilter.

The support plate is mechanically connected to the load cell, but in such a way that tapping/hitting the support plate, when the system is in the protected mode, does not apply move the load cell free end. This may be done by a fork-arm that extends down from a fork-plate to connect to the load cell free end, but wherein the entire weighing system (fork-plate, fork-arm/connector, and entire load cell) is in a lowered position wherein the fork-plate cannot move any further downward and, hence, cannot force the free-end of the load cell downward. Thus, in the protected mode, the load cell free end is protected from extreme movement. Switching to the weighing mode lifts the entire system (fork-plate, fork-arm/connector, and entire load cell) up to a position wherein the fork-plate, fork-arm/connector, and load cell free end can then move downward again due to the weight of the portafilter, and, thus, the load cell operates to measure/signal the weight of the portafilter and any contents.

Said switching between protected mode and weighing mode may be accomplished by an actuation system that pulls the weighing system downward a maximum amount, so that the fork-plate abuts downward against a stationary arm system that is a rigid, anchored and immovable structure. This way, in the protected mode, weight/force on the fork-plate is supported by the pulled-down fork-plate abutting on the stationary arm system, which combination becomes the "anvil" against which the portafilter may be tapped/hit without damaging the load cell.

The actuation/switching of protected mode versus weighing mode may be accomplished, for example, by a solenoid system that operates a movable latch/lock, through linear and/or rotational motion, to effect the actuation/switching.

Certain embodiments of a latch/lock are a cam unit that, in protected mode, pulls (preferably rotates/pivots) the weighing system down to the protected position. For example, the cam unit may pull/pivot a cradle holding the load cell, and therefore pull/pivot the associated fork-arm to press the fork-plate against the top of the stationary arm system. This way, as explained above, the fork-plate cannot be pushed/forced any further downward and the load cell free end is not jolted or shocked. Then, for weighing mode, a switch may actuate the solenoid to move the cam to release/lift the cradle (and, hence, the cradled load cell, connected fork-arm and fork-plate), pivoting the weighing system back to an operable position.

The activation/switching may be controlled by the user resting the handle of the portafilter frontward, down against a handle support portion that comprises an electric/electronic switch, for example. With the user thus resting the handle (and normally, naturally, releasing it), the switch signals the solenoid to move the cam to pivot the weighing system to a raised position. In this raised position, the fork-plate is raised above the stationary arm system, and portafilter weight on the fork-plate causes downward movement of the fork-plate (but not so far that it again hits the stationary arm system), downward movement of the connected fork-arm, and downward force on the free end of the load cell. This force/load on the load cell free end will cause strain/deformation of the load cell and a resulting measurement of weight. Lifting of the portafilter, and especially lifting the handle from the switch, will signal/switch the solenoid to return the cam or other mechanism to the protected mode, pulling/pivoting the weighing system downward again to the protected position.

Figure 2:
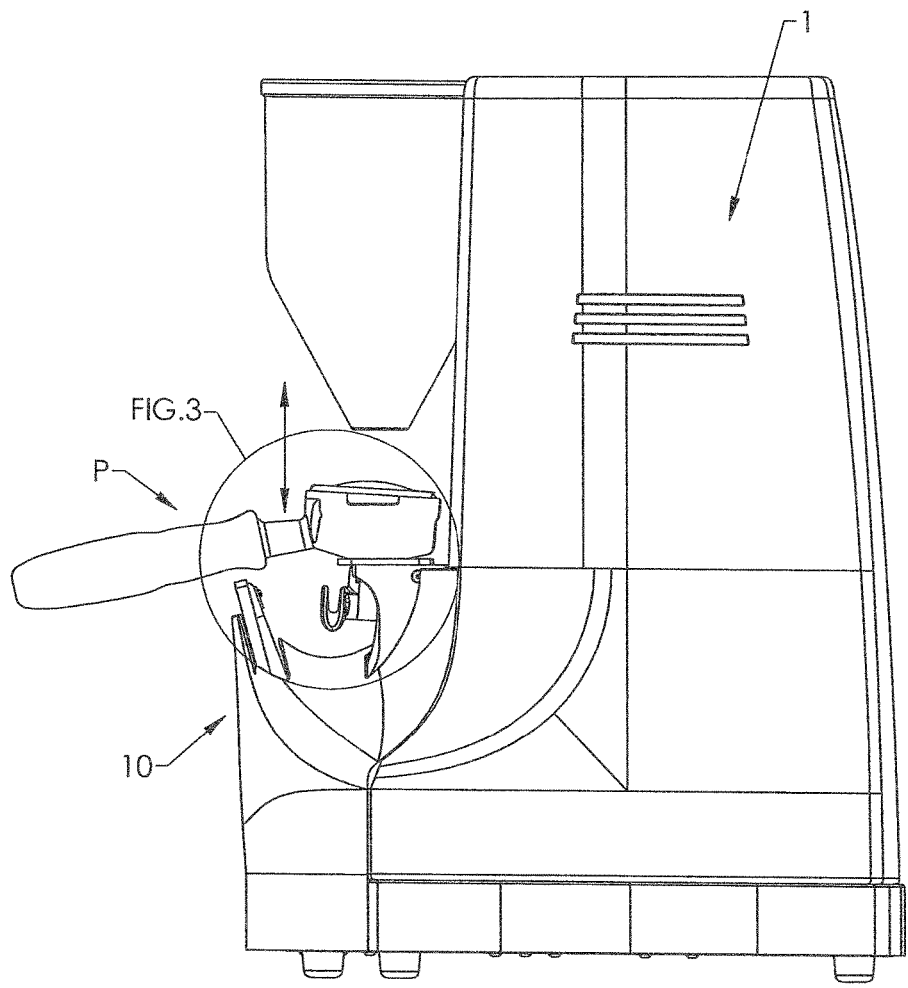
FIG. 2 is a right view of the coffee grinder and device of FIG. 1, the portafilter handle raised to place the device in the load-cell-protected mode, and therefore allowing tapping (arrow) upon the device during dispensing, or between multiple dispensings, of the coffee grounds into the portafilter basket.
Figure 3:
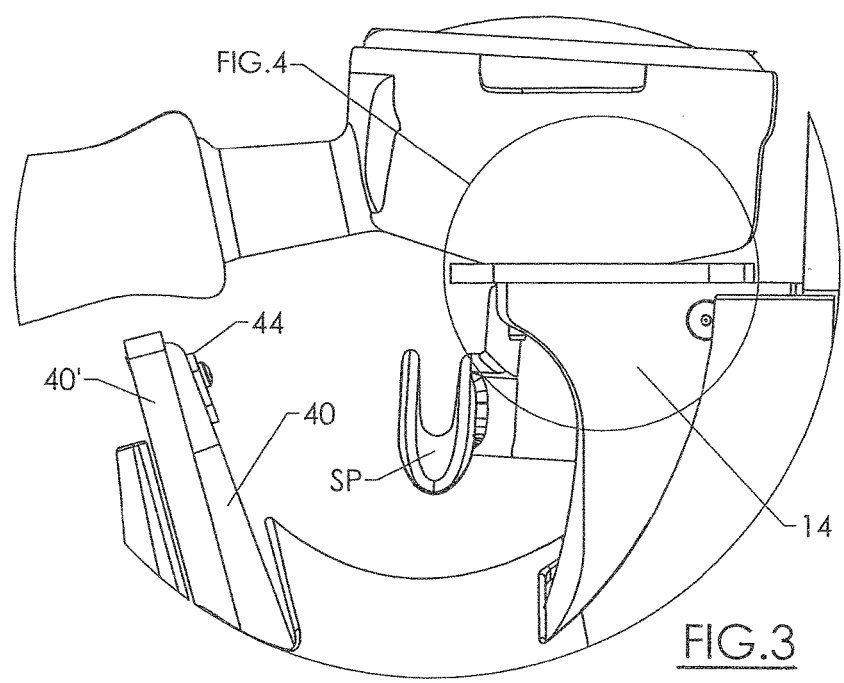
FIG. 3 is an expanded detail view from the circled area of FIG. 2, showing that during this load-cell-protected process, the fork-plate is lowered to an extent that it rests against the adjacent stationary arm.
Figure 4:
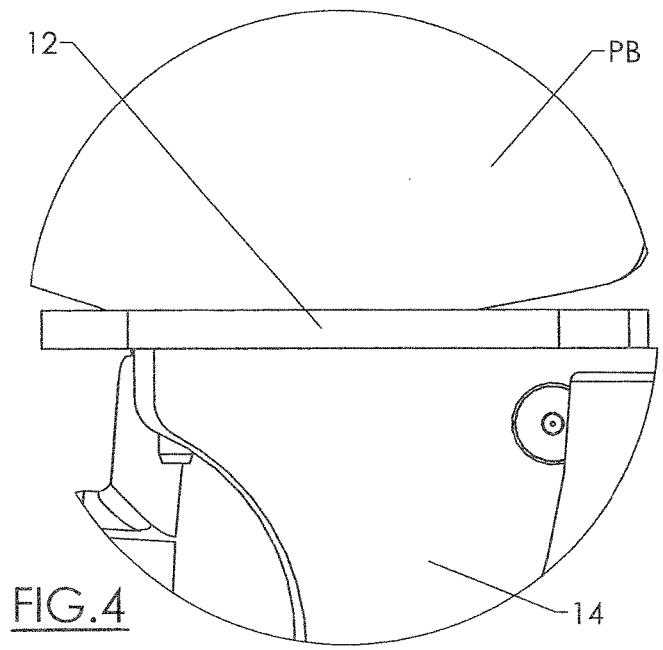
FIG. 4 is an enlarged detail view from the circled area of FIG. 3, showing there is no gap between plate 12 and arm 14, preventing any loading from being passed to the load cell.

Referring specifically to FIGS. 1-18, certain pieces-parts may be named and called-out as follows. FIG. 1 shows grinder 1 with its grounds dispensing cone (outlet) 2, with one embodiment of a dual-mode, "switched-embodiment", portafilter weighing, platform device 10 connected to the front side of the grinder 1, which is closest to the barista. On the platform device 10 rests portafilter P, which comprises portafilter basket PB with depending liquid spout SP and portafilter handle PH. Note that the basket PB and the handle PH are resting on a rearward support portion (away from the barista) and a forward support portion (near from the barista), respectively, and the spout SP depends down into a space between said forward and rearward support portions. With the portafilter thus resting on the device 10, hands-free, the device 10 and its internals are in weighing mode, as will be further discussed below. FIG. 2 illustrates the basket resting on the forward support portion, with handle lifted up off the forward support portion, for example, during filling or during tapping. FIG. 3 and FIG. 4 illustrate the position of the forward support portion during the protected mode, which occurs whenever the handle is lifted up off the switch 44 on the front arm system (comprising central portion 40 and a U-shaped outer portion 40'). The result that is visible in FIGS. 3 and 4 is that fork-plate 12 (which is fixed to and movable with "inner" or "moveable" fork-plate arms 13, called out in FIGS. 13-16 and 18) is lowered fully to abut down against the upper ends 16 (called out in FIGS. 7 and 13) of stationary arms 14. Note that there is no gap between the bottom surface of fork-plate 12 and the top surface of arm 14 in FIGS. 3 and 4. Thus, if the barista picks up the portafilter entirely (note the handle will still be off of the switch 44 and so the device will still be in protected mode) and hits (typically taps) the portafilter against the fork-plate 12 to settle the grounds, the fork-plate 12 cannot move further downward, and the combination of the fork-plate 12 against the top ends 16 of the stationary arms 14 forms an anvil for said hitting/tapping. The free end of the load cell (shown in subsequent figures), during this tapping process and whenever the device is in protected mode, is protected ("shielded") from the taps and does not move. The internal systems that cooperate to produce this protected mode will be discussed in detail later in this document.

Figure 5:
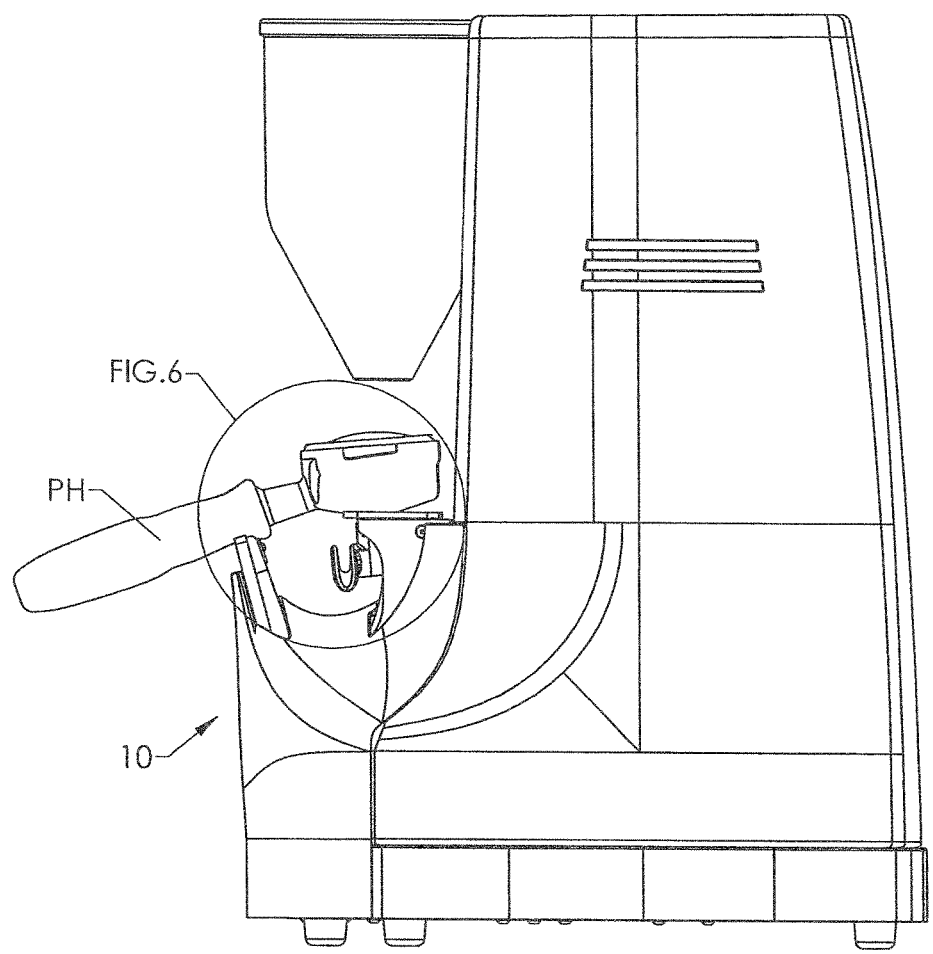
FIG. 5 is a right view of the coffee grinder and device of FIGS. 1-4, wherein the portafilter handle rests against a switch, to switch the device to the unprotected, weighing mode.
Figure 6:
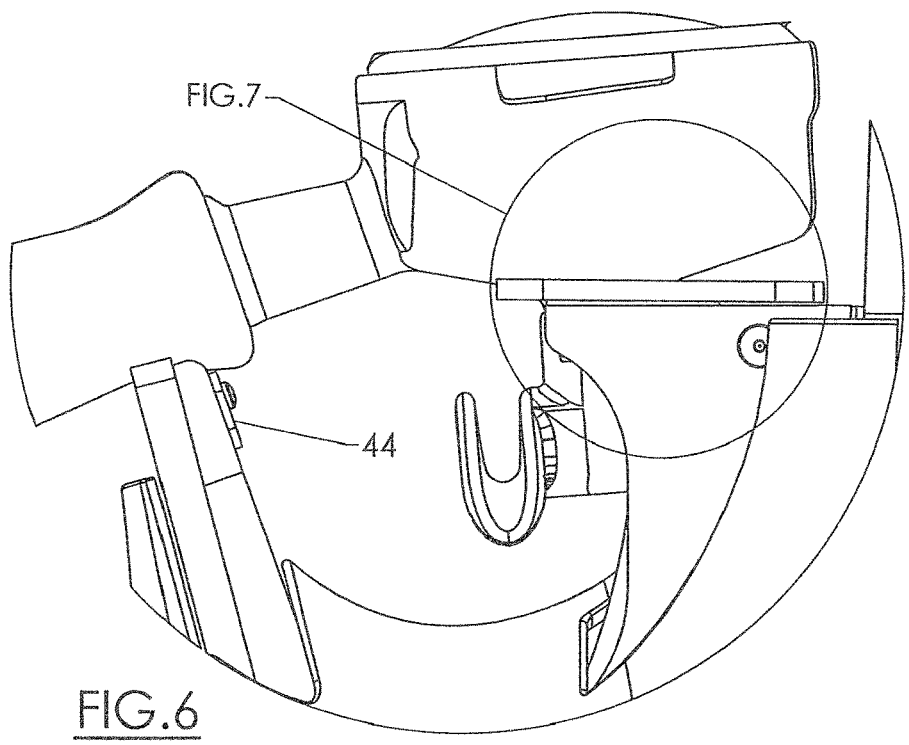
FIG. 6 is an enlarged detail view from the circled area of FIG. 5.
Figure 7:
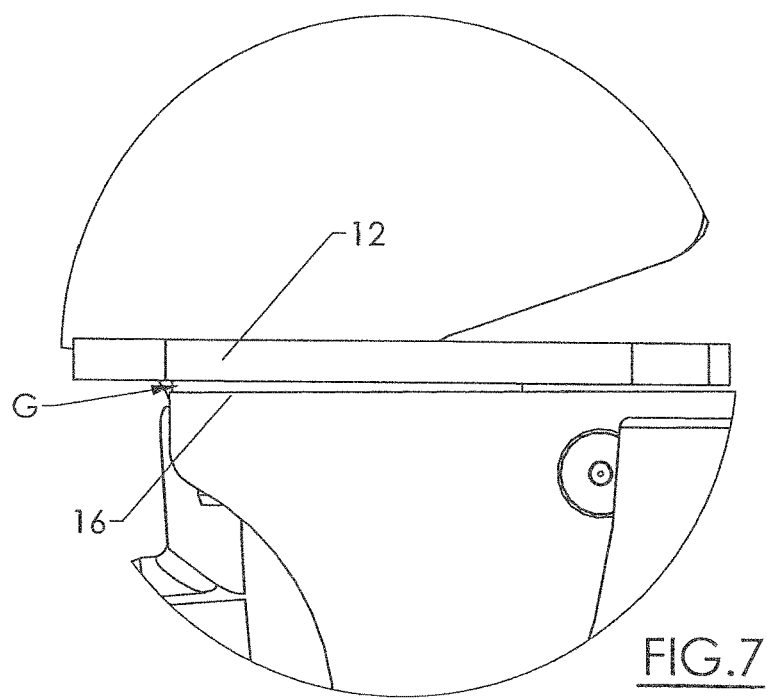
FIG. 7 is an enlarged detail view from the circled area of FIG. 6, showing there is gap between the plate 12 and the top end 16 of the stationary arm, allowing loading to be passed to the load cell free end, for weight measurements.

FIG. 5 illustrates weighing mode, with the portafilter entirely resting on the device, as it is in FIG. 1. Enlarged FIGS. 6 and 7 show how the handle is resting on and contacting the switch 44, and how the fork-plate 12 (and the inner, fork-plate arms 13) are raised up so there is a gap G between the bottom surface of the fork-plate 12 and the top surface of the top ends 16 of the outer, stationary arms. This raising of fork-plate 12 and arms 13 is accomplished by internal systems that cooperate for this weighing mode, as will be discussed in detail later in this document. With the device 10 in weighing mode, the portafilter support system (forward and rearward support portions, comprising fork-plate 12, arms 13, and front arm system 40, 40') support the entire weight of the portafilter and due to being mechanically connected to the free end of the load cell, push down on said free end to strain the load cell. The load cell (via strain gages, and wired communication 29) sends a signal that corresponds to the weight on the support system, ie, the weight of the portafilter (and contents if any). Although the entire support system will move down an amount corresponding to the portafilter (and contents) weight, this will be most visible and understandable by viewing the gap G. This gap G will change (lessen) the more the portafilter weighs, and the more grounds are placed in the basket. Thus, upon a first partial filling, the gap G will be relatively large, but after filling with additional grounds, the gap G will be smaller (support assembly and load cell free end pushed down farther), but the fork-plate will typically still not reach top ends 16 of arms 14, and, hence, will not "bottom out" against the top ends 16. The entire range of the possible gap G, therefore, will typically correspond to different weights of portafilter plus contents being "read"/reported by the load cell.

FIGS. 8-13, 13A and 14-18, show the internals of the device 10 that cooperate to place the device in the protected mode of FIGS. 2-4 and the weighing mode of FIGS. 5-7. In these figures, one may see the load cell system 20, which comprises load cell 24 having fixed end 26 and free end 28. A rotatable cam system 21, featuring cam 22 operated by a solenoid system 50, serves to pivot a cradle 30 holding the load cell, and hence the load cell and its associated elements, between the protected mode/position and the weighing mode/position. Starting from near the bottom of the device (baseplate 100), right and left, non-moving, anchor blocks 70 are fixed to the baseplate 100 by fasteners 39. Cradle 30 comprises a cradle floor 33 and right and left cradle sidewalls 35, 37, wherein pivot assembly 60 is formed by the cradle being pivotally connected to the anchor blocks 70 by on a pivot axle/member(s) 62. Load cell fixed end 26 is fixed to the cradle floor 33 by fasteners 31. The cradle floor 33 is shaped to be thinner, so that the upper surface of the floor is relatively recessed/lower, at its front end compared to its rear end where fixed end 26 is fixed to floor 33; this way, the free end 28 of the load cell 24 extends out over (cantilevers over) the front end of the cradle floor without touching said floor front end. This allows downward force on the free end to strain (deform, flex) the load cell, resulting in load cell weight readings. The portafilter support system is connected to the free end 28 of the load cell by the inner, movable arms 13 being rigidly connected/fixed to an arm-connection block 32, and the block 32 being fixed to the load cell free end 28. In the embodiment drawn, the block 32 has a hollow rear end into which the free end 28 extends, and fasteners 34 fix the free end 28 to the block 32. Inner arms 13 (to which are fixed handle-rest arm 40'40' and fork-plate 12) are fixed to block 32 on either side of the block (see connection C13 in FIG. 14). Note that outer, non-moving arms 14 are fixed to the baseplate 100 at connection C14 (FIG. 14). Therefore, the support system (fork-plate 12, arms 13, arm 40, 40' and connector block 32) is fixed rigidly to the free end 28 of the load cell and the fixed end 26 of the load cell is fixed to the rear end of the cradle. The cradle can therefore be used to lower and raise the load cell (and the support system attached to its free end) into and out of the protected mode, respectively.

Figure 8:
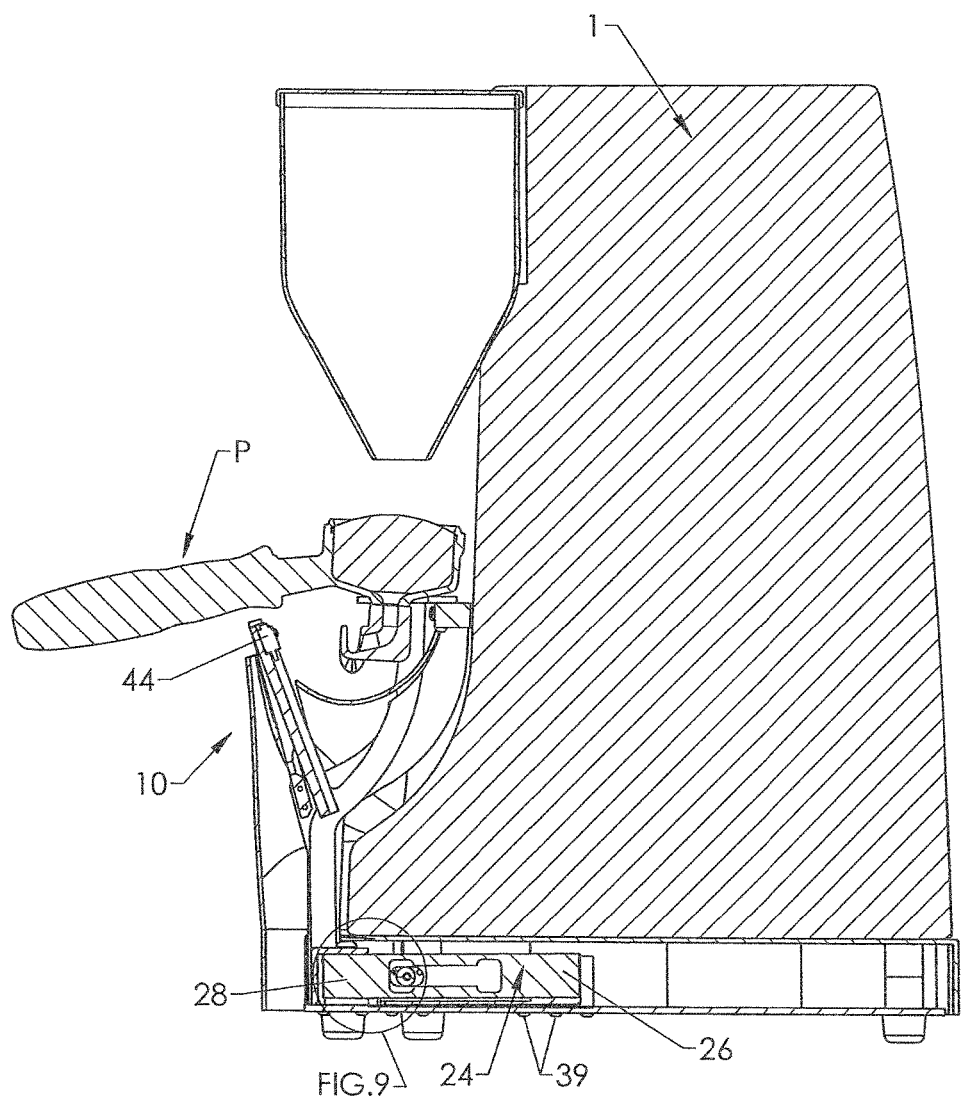
FIG. 8 is a cross sectional view of the grinder and device of FIG. 1, generally from the view line 8-8 in FIG. 1. This embodiment shows the portafilter handle raised, and the fork-plate resting solidly against the "anvil" structure (the stationary arm), preventing any loading from being passed to the load cell.

When the device is switched into protection mode, as in FIGS. 8 and 9, which is the default mode when nothing (particularly not the handle PH) is resting on the switch, the solenoid system 50 actuates the cam system 21, to rotate cam 22 so that the enlarged lobe 23 of the cam 22 pushes the front end (nearer the barista) of the cradle 30 downward, as in FIG. 9; the cam 22 is received through apertures AC of the cradle sidewalls 35, 37 and rotates against (and pushes against) said sidewalls 35, 37. The cam 22 also extends through the aperture of the load cell, but is sized to not push or abut against, and so not impede, the load cell. Thus, when the cam is rotated to lower the cradle 30, the cam engages the sidewall(s) 35, 37 to lower the entire cradle 30, which by its connection to the fixed end 26 lowers the load cell 24, which by the free end's 28 connection to the block 32 lowers the block 32, which by the block's 32 fixed connection to arms 13 lower the arms 13 and connected handle-rest arm 40, 40', which by the arms' 13 fixed connection to the fork-plate 12 lowers the fork-plate 12 to abut against the top ends 16 of arms 14 as in FIGS. 3 and 4.

In FIG. 9, one may see that, with the cradle pulled down to the protected position, the cradle floor 33 is very close to the baseplate 100, and that the cradle floor 33 and the bottom surface of the load cell are slightly slanted downward toward the left of the figure, because the entire cradle and the entire load cell are pivoted, relative to the baseplate 100, on pivot axle 62. Due to said pivoting and said slanting, space S1 between the free end 28 and baseplate 100 is slightly smaller (less high) at the left of the figure than it is closer to the cradle floor 33, and, likewise, space S1' between the cradle floor 33 and the baseplate 100 is slightly smaller (less high) at the left end of the floor 33 than it is at the right of the figure. When the device is switched into weighing mode, as in FIGS. 10 and 11, because the handle is resting on the switch 44, the solenoid system 50 actuates the cam system 21, to rotate cam 22 so that the enlarged lobe 23 of the cam 22 pushes the front end of the cradle 30 upward, as in FIG. 11. The cam rotation pivots the cradle 30 to place load cell to be closer to, or at, horizontal, by means of the cradle's connection to the fixed end 26 raising the load cell 24 with the cradle. The load cell free end's 28 connection to the block 32 raises the block 32, which by the block's 32 fixed connection to arms 13 raises the arms 13 and connected handle-rest arm 40, 40', which by the arms' 13 fixed connection to the fork-plate 12 raises the fork-plate 12 to a raised position above the top ends 16 of arms 14 as in FIGS. 6 and 7.

In FIG. 11, one may see that, with the cradle raised to horizontal in the weighing position (or closer to horizontal than in the protected mode), the bottom surface of the load cell and the cradle floor 33 are not slanting downward toward the left, but instead are horizontal, because the entire cradle and the entire load cell are pivoted, relative to the baseplate 100, on pivot axle 60 to the horizontal position. Space S2 between the free end 28 and baseplate 100 now is greater than space S1, and space S2 thickness (height) is equal all along its length (right to left in FIG. 11); likewise, space S2' between the cradle floor 33 and the baseplate 100 is greater than space S1', and space S2' thickness (height) is equal all along its length (right to left in FIG. 11).

It is important to note that space S2, and space S3 between the load cell and the cradle floor 33, will change when more weight (a more full portafilter, for example) is placed on the fork-plate 12. Free end 28 will be strained downward, moving the free end closer to the baseplate 100 at the left, and closer to the cradle floor 33. This will, in effect, cause the load cell free end to slant down relative to baseplate 100 (making S2 smaller at its left end) and also relative to the cradle floor 33 (making S3 smaller at its left end). S2' will not change, however, as the weight of the portafilter and its contents does not pivot the cradle (which is held in its weighing position by cam system 21). It should be noted that the amount of movement of the free end of a high quality load cell during weighing is very little, for example, in the range of about 0.4-0.9 mm, or even up to only about 0.5 mm. This small amount of movement/strain, however, can result in a very accurate weight reading as long as the load cell is not damaged by excessive strain.

Thus, switch 44 (wired or wirelessly) controls solenoid system 50, which controls cam system 21 to actuate the entire "moving system" M (called out in FIG. 18), comprising cradle 30, load cell 24, block 32, arms 13, arm(s) 40, 40', and plate 12, to pivot at axle 60 by means of pin 62, up into the weighing mode and down the protected mode. When in weighing mode, the support system is positioned so that it can move downward due to weight placed on it, in effect passing the load to the free end of the load cell, which strains the load cell to create a weight signal/reading. It may be noted that associated wiring, circuity and/or programming may be supplied to affect the actuation, strain gage signal transmission and weight reporting, as will be understood by those of skill in the art after viewing this document and the figures.

Figure 12:
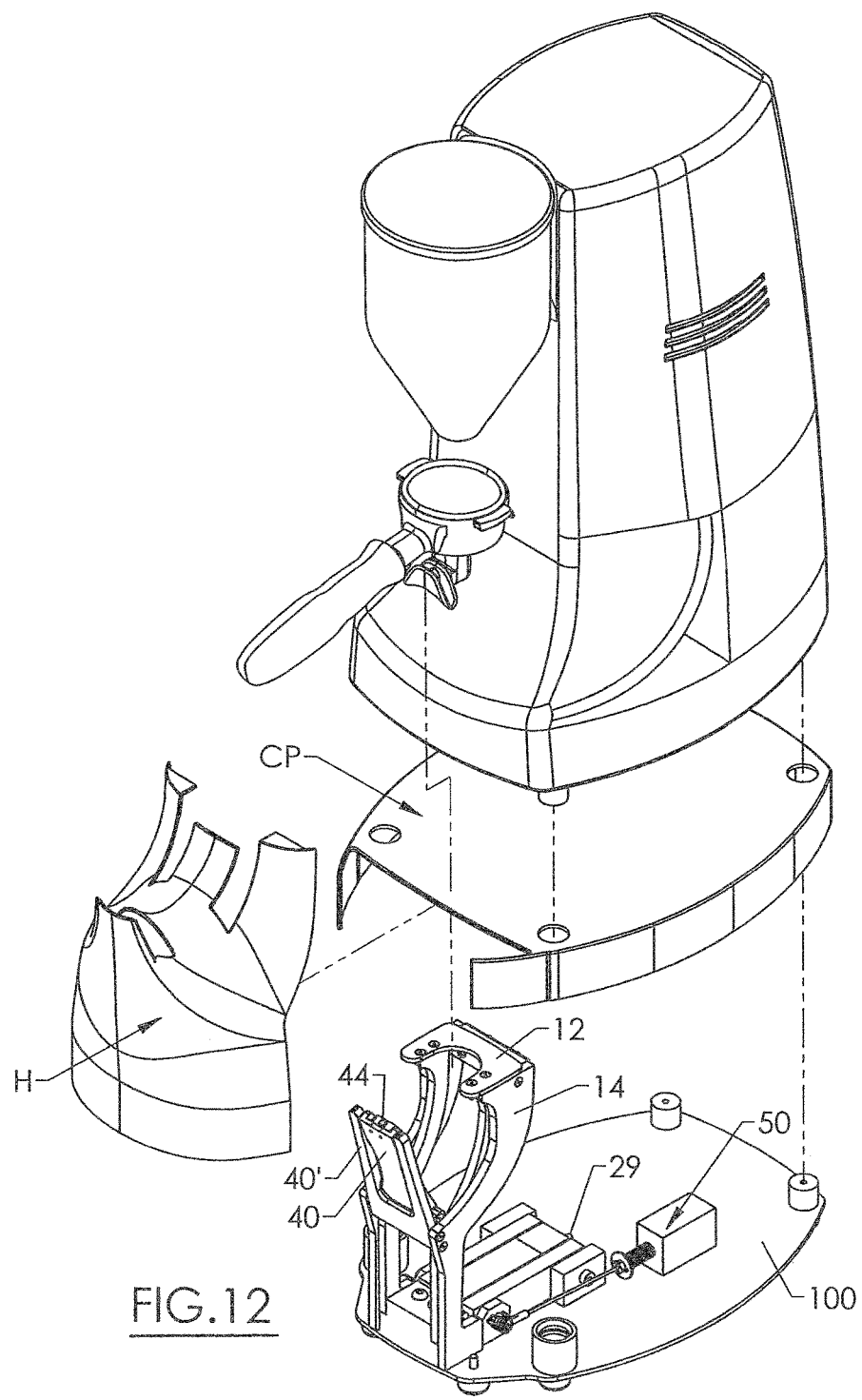
FIG. 12 is an isometric exploded view of the main assembly parts of the embodiment of FIG. 1.
Figure 13:
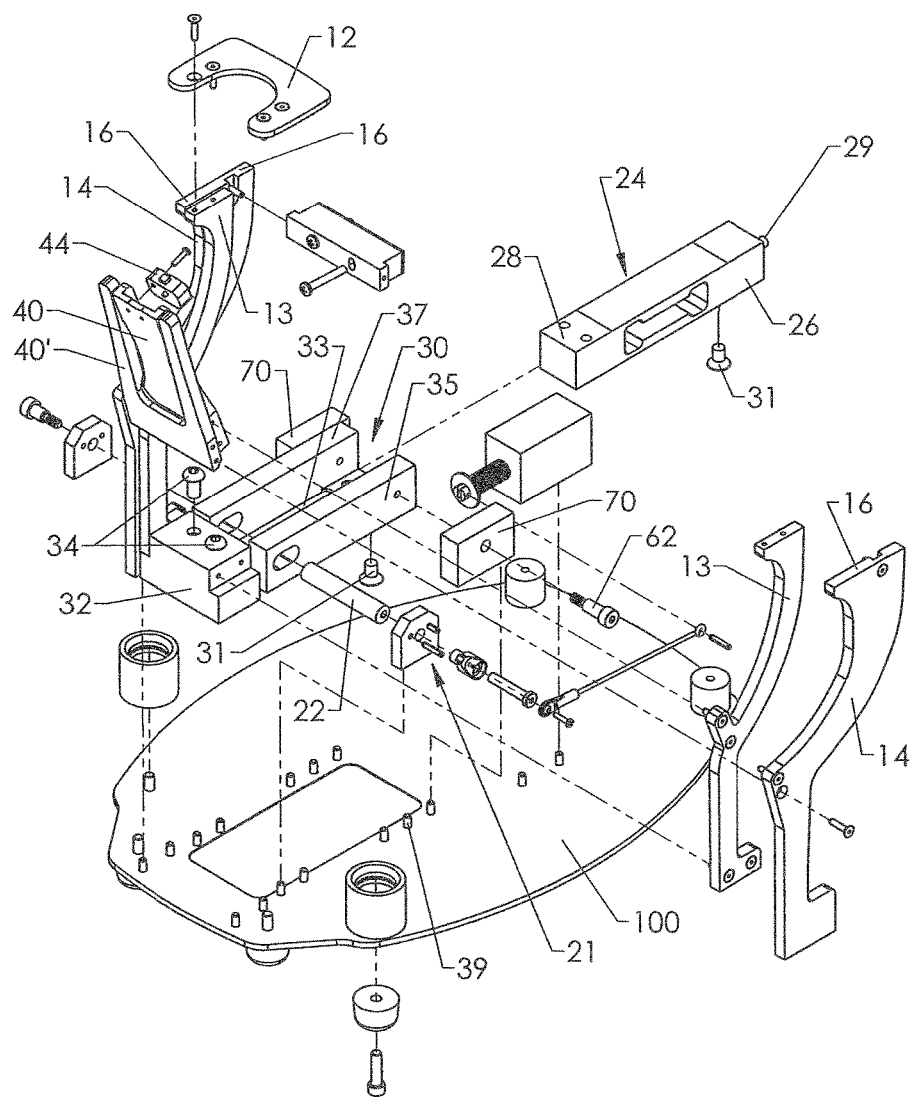
FIG. 13 is an exploded view of the lifting and weighing ("anvil and scale") mechanism shown below the coverplate CP at the bottom of FIG. 12.
Figures 13A, 13B:
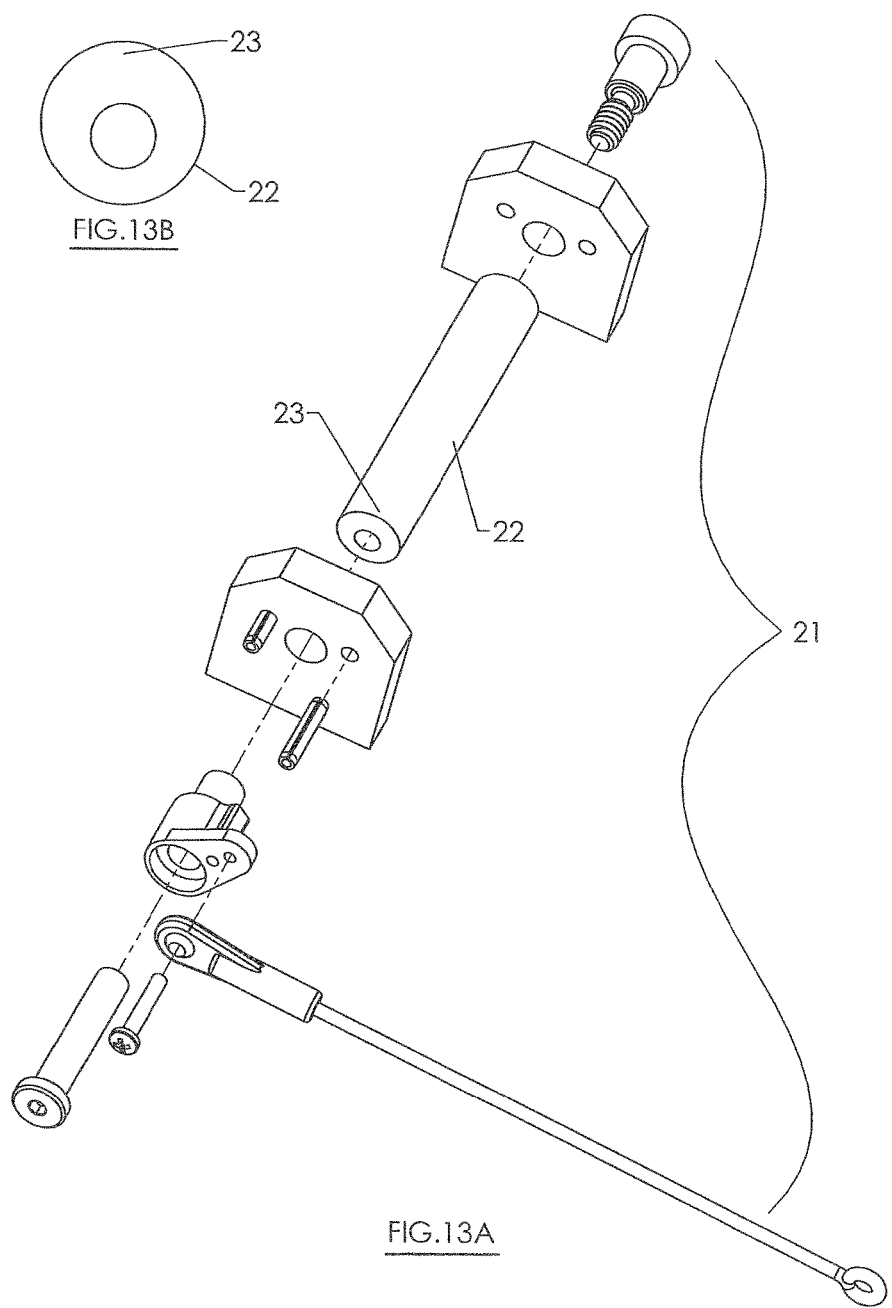
FIG. 13A is an enlarged view of the cam system of the embodiment of FIGS. 12 and 13.
FIG. 13B is an enlarged end view of the cam shaft of FIGS. 12, 13 and 13A.
Figure 16:
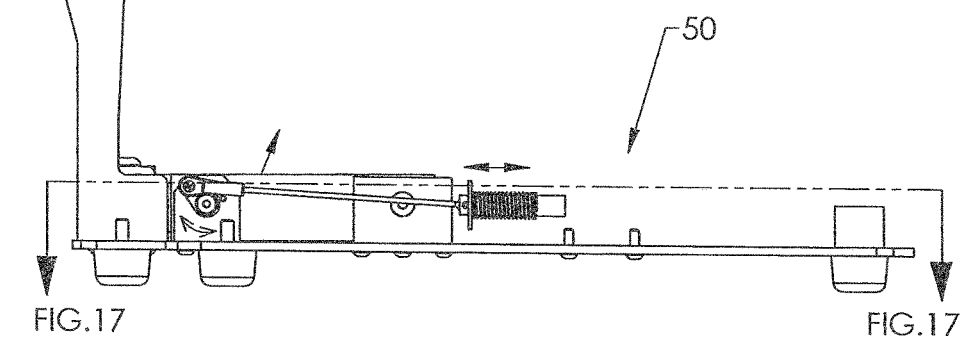
FIG. 16 is a right hand view of the weighing mechanism showing rotation and movement of various parts of the embodiment of FIG. 1, as it transforms into or out of the weighing (unprotected) state.
Figure 17:
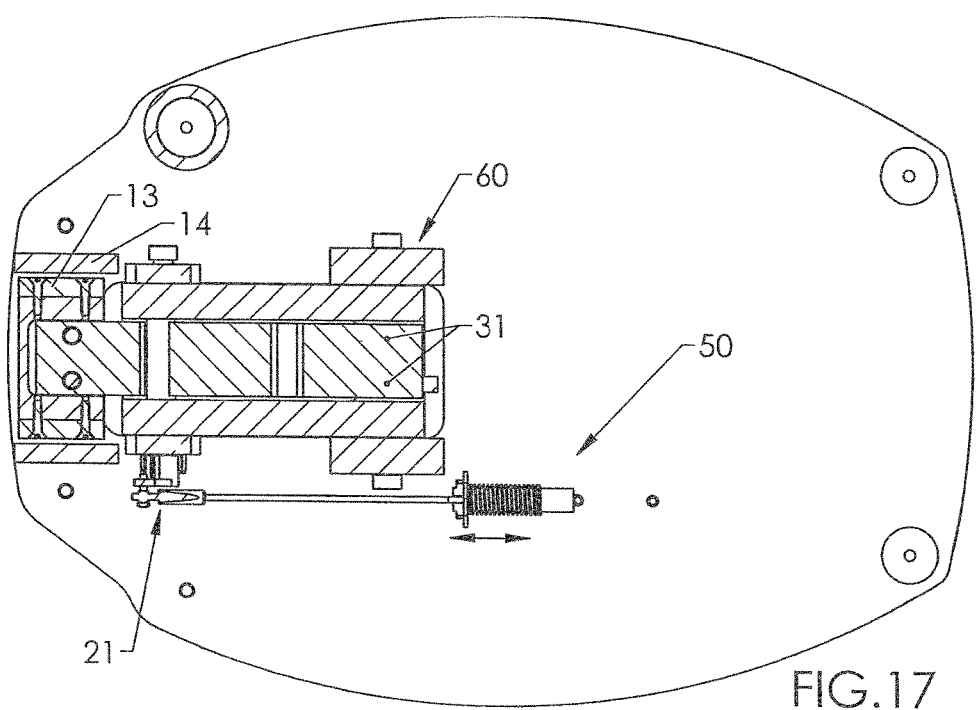
FIG. 17 is a section view that shows some of the clearance details.
Figure 18:
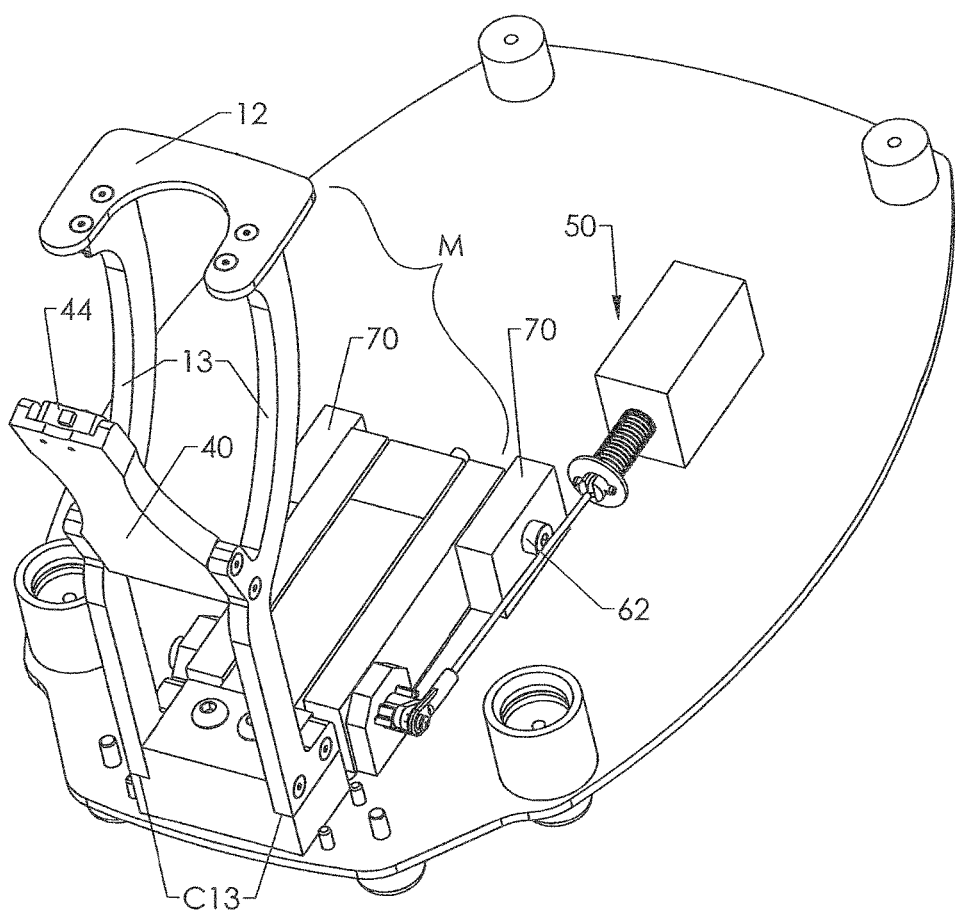
FIG. 18 shows an isometric view of the weighing mechanism of FIG. 1, with the stationary arms removed.

One of skill will also understand that certain of the figures show an embodiment of a housing H that covers the front side (close to the barista) of the device, and a cover plate CP that covers the solenoid, cam, and load cell systems; FIG. 12 shows these features exploded away from the internals of the device 10 for more clarity. Adaptations for secure placement and association of the grinder on the low-profile, generally horizontal rear base portion of the device may include cups 102 and pads 104 upon which the feet the grinder may rest (after passing through the cover plate CP of the base, as shown in FIG. 12, for example). Also, feet 106 may be provided underneath the base portion to rest on a table or countertop. In the embodiments in the drawings, the device is added to the grinder, rather than being OEM, Alternative embodiments of the device may be manufactured OEM as part of a grinder.

It may be noted that preferred handle-rest arm system 40, 40' is fixed and immovable relative to the fork-arms 13, so the combination of the handle-rest arm(s) and the fork-arms form a moving arm system that is generally a Y-shape. A space therefore exists between the rearward portion (arms 13 and fork-plate 12) and the forward portion (arms 40, 40', and switch and associated wiring if the switch communicates by wire), which may be thought of as the space between the upper arms of the "Y".

Referring Specifically to FIGS. 19-25, Especially-Preferred "Movement-Stop" Embodiments:

In certain embodiments, movement of the load cell free end is allowed during tapping or other shocks, but said movement is limited to a safe distance/amount. Limiting structure is placed at one or preferably multiple locations to prevent movement of the load cell free end relative to the load cell fixed end more than a safe amount. Stop(s)/limit(s) are provided at or near one or more of the elements that receive the portafilter and move down in response to the weight of the portafilter and its contents, and/or at or near the free end of the load cell. In the preferred "movement-stop embodiments", no switching, pulling, pushing, swinging, pivoting or rotating of the entire load cell and associated elements needs to be done prior to said tapping/shocks. Rather than by moving the entire load cell system to a position wherein the tapping/shocks will not "reach" or "load" the load cell, the preferred "movement-stop" embodiments allow movement of the free end relative to the fixed end during all or substantially all steps of operation of the grinder and the platform form device, including weighing and tapping. Said movement during weighing and tapping allows movement of the free end, and therefore strain on the load cell, up to a safe maximum movement. The stop(s)/limit(s) may include, for example, a stop underneath the free end of the load cell or underneath a connector or element fixed to said free end, and also a stop underneath the fork-plate on which the basket rests and against which the barista will typically tap the portafilter for settling the grounds.

The inventor has determined that this safe, maximum amount/distance may be larger/farther than the movement amount/distance typically occurring during weighing of the portafilter and its contents (if any). Therefore, the preferred stop(s)/limit(s) are not typically reached when the portafilter is empty (being tared) or partially or entirely filled with grounds and being weighed, and therefore, the preferred stop(s)/limit(s) do not need to be moved or adjusted prior to weighing or at any time. For example, with certain embodiments of high quality load cell, the stop(s)/limit(s) may be placed to allow as much as about 1 mm of movement, while weighing a typical filled portafilter may cause less movement, for example in the range of about 0.4-0.9 mm. Or, for example, with other embodiments of high quality load cell, the stop(s)/limit(s) may be placed to allow as much as 0.5 mm of movement, while weighing a typical filled portafilter may cause less movement, for example in the range of about 0.1-0.4 mm. In certain embodiments, excessive movement, or potentially damaging movement, may be defined as an amount of movement in the range of 10-30 percent more movement than movement of the free end of the load cell caused by the portafilter full of grounds. As discussed above for the embodiment of FIGS. 1-18, the amount of movement of the free end of a high quality load cell during weighing is very little, but can result in a very accurate weight reading as long as the load cell is not damaged by excessive strain.

The stop(s)/limit(s) may be placed, for example, below the free end of the load cell and/or underneath the basket-support/plate on which the basket rests. Preferably, a stop/limit is placed at each of these locations and preferably they allow the same amount of movement or approximately the same amount of movement. For example, the stop/limit nearer the top of the device (directly under at least a portion of the fork-plate) is about 0.5-1 mm (more preferably 0.7-0.9) from the fork-plate when said fork-plate is in a fully-raised position and the stop/limit nearer the bottom of the device (directly under at least a portion of the load cell free end) is about 0.5-1 mm (more preferably 0.7-0.9) from the bottom surface of the load cell free end when said free end is in a fully-raised position. In certain embodiments, excessive movement, or potentially damaging movement, may be defined as an amount of movement in the range of 10-30 percent more movement than movement of the free end of the load cell caused by the portafilter full of grounds. If the two stops each allow exactly the same amount of movement, both will be reached at the same time in theory, but even given manufacturing tolerances or inconsistencies in manufacture and wear, at least one of the two stops will be reached before an unsafe amount of movement.

Referring specifically to FIGS. 19-25, one may understand that many of the features of the especially-preferred "movement-stop" embodiments are similar to, and share many common structures, features, and method steps with, device 10 described above. As in the device 10 of FIGS. 1-18, platform device 200 is placed immediately adjacent (against, and in front of, that is, closer to the barista) the grinder 1, and preferably mechanically (and optionally also operationally) connected to the grinder 1. As shown schematically in FIG. 25, the grinder 1 will typically set on top of the low-profile, horizontal base 201 at the rear of the device 200, while the generally Y-shaped portafilter support system 202 extends upward between the grinder and the barista, and the basket support portion and the handle support portion form the two upending arms of the Y-shaped system 202 and provide a space/gap between them for receiving a portafilter spout. Note that no housing is shown covering the portafilter support system 202 in FIGS. 19-25, but would typically be added as understood from housing H described earlier and shown in several of FIGS. 1-18.

The main differences between the device 10 of FIGS. 1-18 and the embodiments of FIGS. 19-25 are that the load cell protection system is changed and simplified in the embodiments of FIGS. 19-25. The moving system M (solenoid, cam system, and pivot axle system of device 10) is eliminated or at least substantially simplified, that is, the structure and electronics/electrics required for switching, pulling, pushing, swinging, pivoting or rotating of the load cell and associated elements out of the way of the force/shock of tapping or other impacts, prior to said tapping/impacts, are preferably eliminated. This results in much-simplified embodiments that still protect the load cell, and that are, in effect, automatically capable of weighing and also protecting the load cell without switching between two separate modes.

Figure 19:
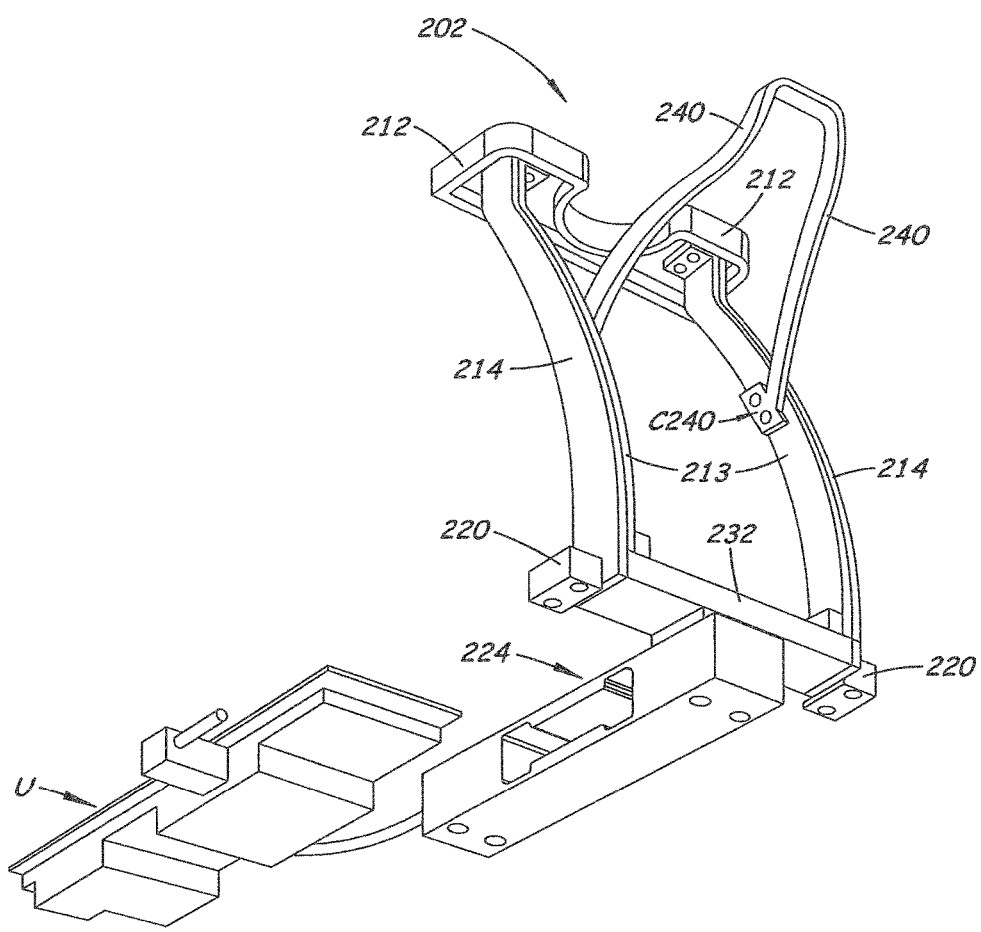
FIG. 19 is a left perspective view of an alternative embodiment of the invented platform device, removed from its housing and base, this being one but not the only example of a "movement-stop" or "movement-limit" embodiment wherein load cell movement is limited to a maximum safe distance/amount of movement/strain.
Figure 20:
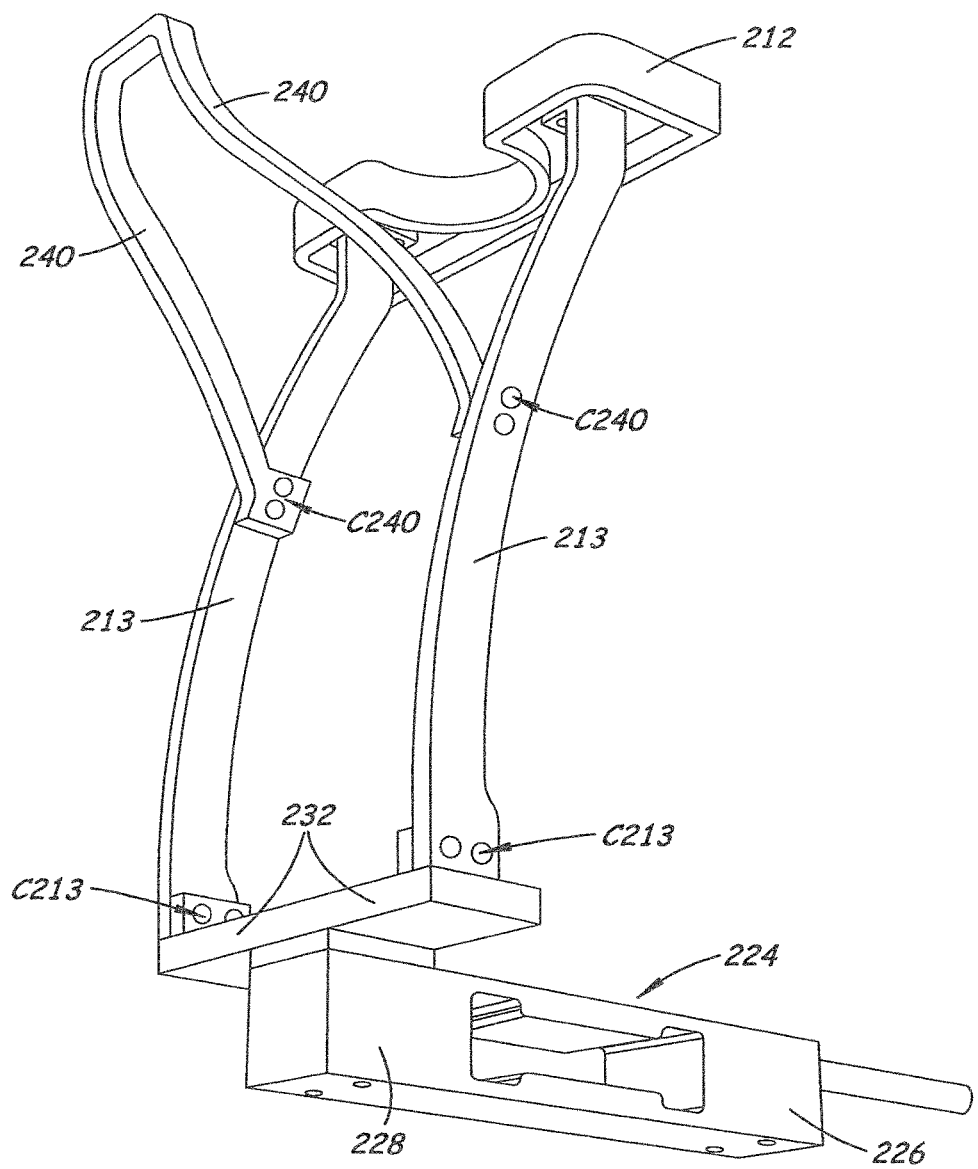
FIG. 20 is a right side view of portions of the embodiment of FIG. 19, wherein stationary arms and load cell electronics unit have been removed.

Referring specifically to FIGS. 19 and 20, one may see important elements of the platform device 200, removed from any housing and removed from the forwardly-extending base 201. FIG. 19 illustrates portafilter support system 202, the load cell 224, and associated electronics unit U for receiving, processing, and transmitting the load cell strain gage signal(s). It may be noted that there is no cradle, pivot axle, cam system, or solenoid included or needed, as the load cell and the portafilter support system 202 are not, and need not be, switched to a protected mode by moving them in their entirely "out of the way" of tapping and shocks. FIG. 19 shows rigid inner arms 213 fixed at their top ends to fork-plate 212, and fixed at their bottom ends to, and connected by, connector 232 (at connection C213 called out in FIGS. 20 and 21). Rigid handle-support arm (a "generally U-shaped bracket") 240 extends forward from arms 213, being fixed and rigidly connected to arms 213 about midway along the length of arms 213, that is, connected at connections C240 to central regions of each arm 213. Rigid, immovable, outer arms 214 extend generally parallel to arms 213, along substantially the entire length of arms 213, wherein the arms 214 are beside but outside of their respective arms 213. The top ends 216 of arms 214 do not attach to fork-plate 212, but the bottom ends 220 are adapted to be fixed to the base 201, for example, at walls 203 or other stationary and rigid portions of the base 201 (see FIG. 21).

FIG. 20 shows the platform support system 202 and the load cell 224 system, as in FIG. 19, but with the outer, non-movable arms 214 removed for better viewing of the fork-plate 212 and the inner arms 213. Fixed end 226 is fixed, and immoveable relative, to a portion of the base 201, while the free end 228 is cantilevered over any underlying structure of the base. The handle-support arm/bracket 240 does not move relative to arms 213, and the entire combination of the plate 212, arms 213, arm/bracket 240, and connector 232 is a rigid unit rigidly connected to free end 228 of the load cell. Therefore, weight on the fork-plate 212 and/or arm 240 pushes the arms 213, connector 232, and, hence, free end 228 downward, to provide a strain gage signal corresponding/correlatable to the weight of the object (typically, portafilter, and contents if any) on the platform support system 202. Thus, the barista will rest the entire portafilter on the system 202 "hands-free", in order to weigh said portafilter and its contents, but the resting of the handle, unlike in device 10, does not contact or comprise a switch or cause any switching of modes. The strain/flexing of the load cell, in response to said weight, causes the strain gages to transmit the signal/weight measurement to associated electronics unit U, which may include electronics, software, firmware, and hardware, for the load cell signals and/or for processing the signals and/or transmitting and receiving communications to and from (wireless or wired) the grinder and/or a digital device DD for use by the barista/management, and/or to a computer/network/cloud system that may serve as a gateway/controller for some or all of the method steps and calculations. Alternatively, or additionally, additional control, software, firmware, hardware, control, and transmitter and receiver elements for wireless (or wired) communication, may be included in other equipment, such as an espresso machine or combined grinder and espresso machine controller/computer.

FIGS. 21 and 21A illustrates schematically how the embodiment of FIGS. 19 and 20 may be installed in the base 201 for use, for example. With portafilter P in place on the fork-plate 212, the rigid combination of fork-plate, arms 213 and 240, and connector 232 push the free end 228 down by virtue of the mass of the portafilter and its contents. A bottom gap GB exists between the upper surface 280 of the base structure underneath the free end 228 and the lowermost surface 290 of the free end. A top gap GT exists between the top end surface 216 (uppermost surface) of the outer arms 214 and the lowermost surface 291 of the fork-plate 212. Surfaces 280 and 216 both serve as the stops/limits to prevent the load cell free end 228 from moving a damaging amount/distance. Either one of the surfaces 280, 216 will typically be sufficient to protect the load cell, but both are preferred.

More specifically, to provide the top stop adaptation, top surfaces 216 of the two outer arms (or "anvil" arms) 214 are each a rigid, non-compressible stop that prevents the plate 212 (basket support portion) from moving downward more than the distance of the gap GT (underneath the plate 212) between surface 216 and the bottom surface 291 of the plate 212. This gap GT will change depending on the weight of the portafilter and contents placed on system 202, but at its largest (no weight on system 202 and no tapping or shocks to system 202) it will be greater than the distance the plate 212 (and likewise, arms 213, arm-connector 232 and load cell free end 228) will move downward during weighing of the portafilter and its contents. For example, the gap GT will be may be about 0.5-1 mm (more preferably 0.7-0.9) measured from surface 216 to the bottom surface of the plate 291 when said plate is in a fully-raised (unweighted and untapped/unshocked) position. Thus, one may say that the top limit in such embodiments may be placed at 1 mm, or more preferably 0.9 mm, from the lower surface of the fork-plate bottom surface.

More specifically, to provide the bottom stop adaptation, surface 280 is a rigid, non-compressible stop that prevents the free end 228 from moving downward more than the distance of the gap GB. Like gap GT, gap GB will be small and will change depending on the weight of the portafilter and contents placed on system 202, but at its largest (no weight on system 202 and no tapping or shocks to system 202) it will greater than the distance the load cell free end 228 will move downward during weighing of the portafilter and its contents. For example, the gap GB will be may be about 0.5-1 mm (more preferably 0.7-0.9) measured from surface 280 to the bottom surface of the load cell free end 290, when said system 202 is in a fully-raised (unweighted and untapped/unshocked) position. Thus, one may say that the bottom limit in such embodiments may be placed at 1 mm, or more preferably 0.9 mm, from the bottom surface of the load cell free end.

Figure 22:
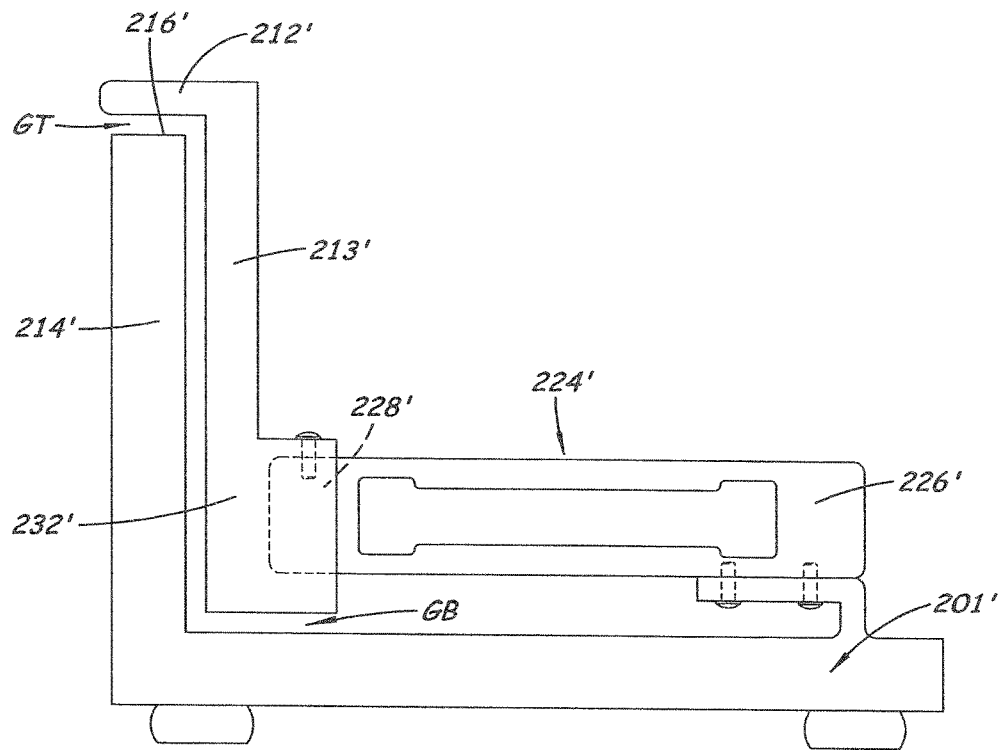
FIG. 22 is a schematic view of a movement-stop embodiment similar to that of FIGS. 19-21A, showing the orientation and position of the load cell and the gap existing between the plate/connectors members and limiting surfaces prior to weighing or tapping.
Figure 23A:
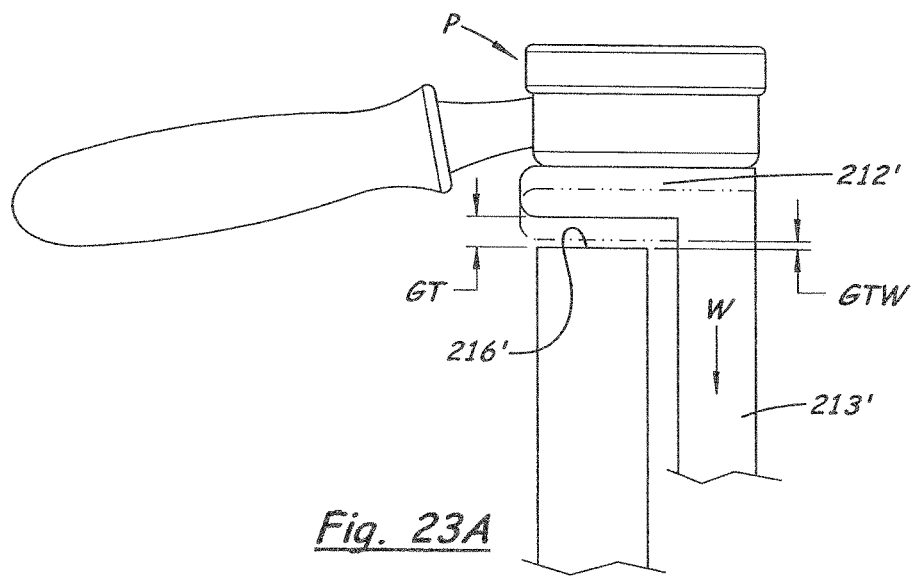
FIG. 23A is a side view of the top end of the schematic embodiment of FIG. 22, wherein the portafilter rests "hands-free" so that the weight of the portafilter and its contents will push movable elements down, lessening the top gap to be a "gap under weight" but not lessening the gap to an extent that it is closed.
Figure 23B:
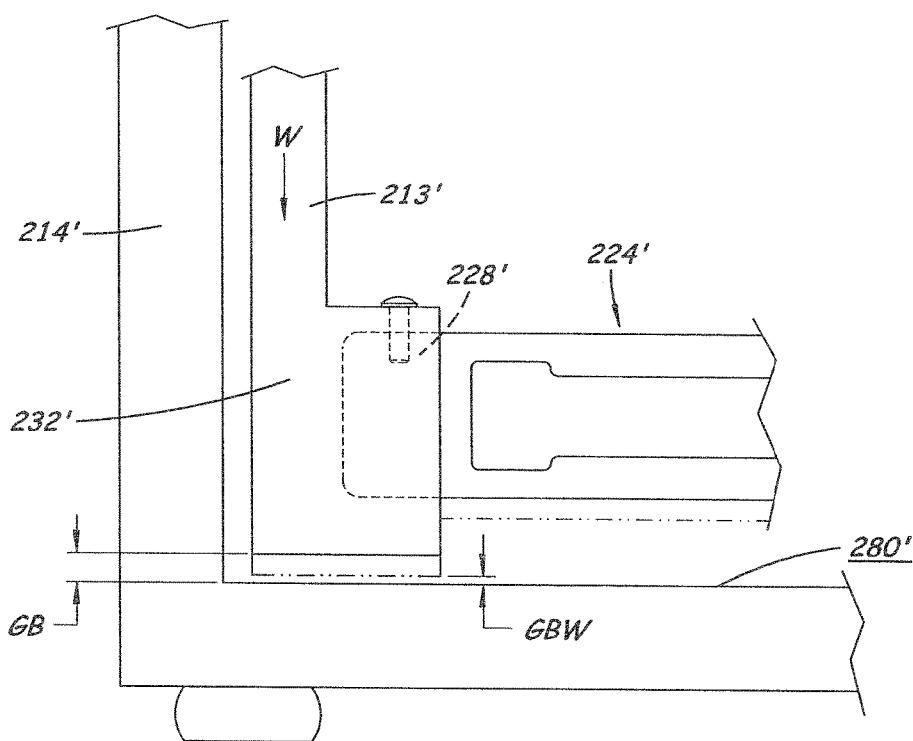
FIG. 23B is a side view of the bottom end of the elements of schematic FIG. 22, showing the load cell free end and its associated elements moved down under weight, lessening the bottom gap to be a "gap under weight" but not lessening the gap to an extent that it is closed.

When the device is weighing the portafilter, and its contents if any, the distance the system 202 and the load cell free end 228 will move downward will be less than the maximum gap GT and GB size. This allows weighing to be done without stop/limit surfaces 216 and 280 interfering with or stopping accurate weighing, but, upon tapping or shocks, the system 202 and load cell free end 228 will move down the full amount to close entirely gaps GT and/or GB (typically both), that is, to "bottom out" fork-plate 212 on surface 216 and free end 228 on surface 280, preventing further downward movement and strain on the load cell. FIGS. 22-24B show operation of platform device 200 schematically. The fixed end 226' of load cell 224' is immovably secured to structure of a base 201', and the free end 228' cantilevers out over the base 201'. Free end 228' is connected to connector 232', up from which arm 213' and its top end member (or "plate") 212' extend. A generally vertical arm/member 214' rigidly and immovably extends up from the base 201', to reach near to member 212'. In unweighted and untapped and unshocked condition, as shown in FIG. 22, a gap GT exists between member 212' and the top surface 216' of member 214', and a gap GB exists between connector (in this schematic, that is fixed to and extends farther down than free end 228') and surface 280' of the base. As shown in FIGS. 23A and 23B, in weighted condition (with the weight W of the entire portafilter and its contents (if any) resting on member 212'), the member 212', arm 213', connector 232', and free end 228' move downward part but not all of the way to stop surface 216' and to stop surface 280'. In this condition, gaps GT and GB are now reduced, in this schematic by virtue of the connector 232' bottom surface coming closer to the base surface (280), so that top and bottom gaps under weight (GTW and GBW) are smaller than GT and GB but not completely closed. These gaps GTW and GBW will be different for different weights of the portafilter and its contents, but will be designed so that conventional portafilters and their contents even when the grounds have been tightly packed will not "bottom out" (will not close GT and GB completely), as that would result in inaccurate/false weight readings for the heaviest/fullest portafilters.

Figure 24A:
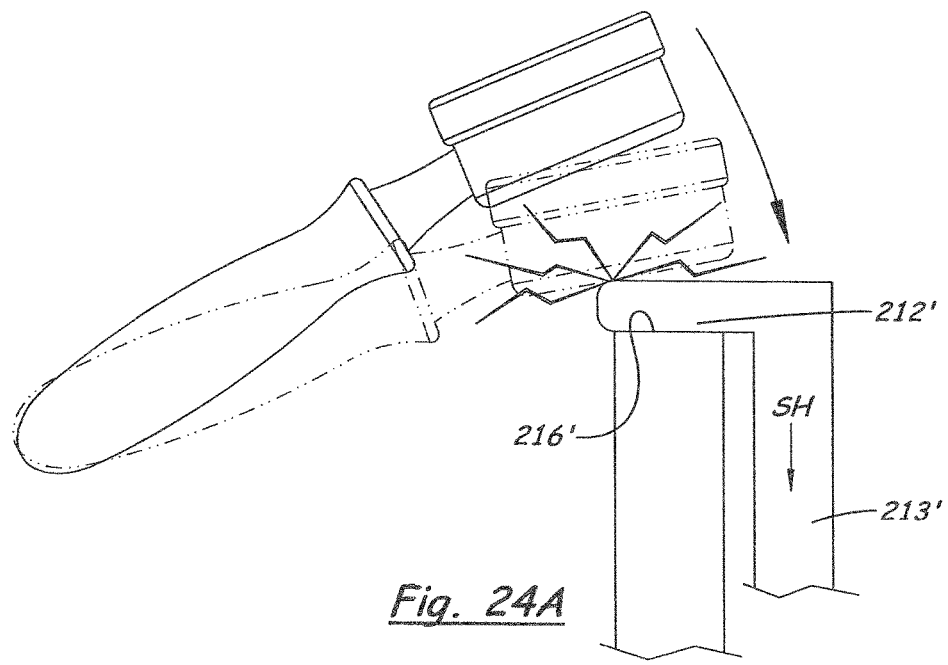
FIG. 24A portrays the top end of the schematic embodiment of FIG. 22, when the portafilter is being tapped/hit on the top member of the device, wherein the shock of this tapping/hit pushes the top member down against the stationary member top surface, limiting further downward movement.
Figure 24B:
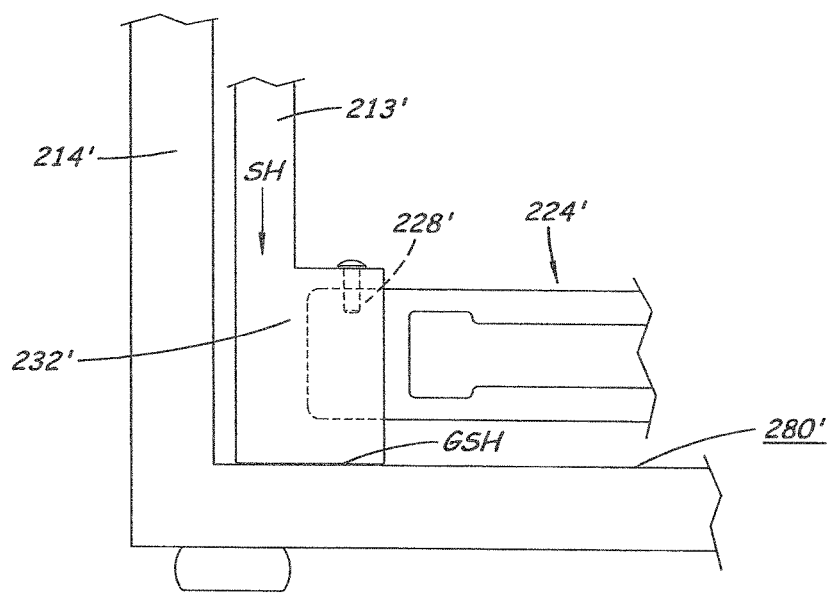
FIG. 24B portrays the bottom end of the schematic embodiment of FIG. 22, wherein the shock tapping/hitting on the top member of the device as in FIG. 24A, pushes the load cell free end and its associated arm and connector downward until a bottom surface of the downwardly-moving elements abuts against the a top surface in the base, limiting further downward movement of the load cell free end.

It should be noted that connector 232' comprises the surface in FIGS. 23B and 24B from which the gaps GB and GBW are measured, and which "bottoms" out on surface 280. Thus, in reviewing FIGS. 19-21 and reading the description of FIGS. 19-21, it may be understood that the lower surface that is limited from extreme movement at or near the bottom of the device 200 may be the load cell free end lower surface or the lower surface of a connector or block or other member that is fixed to the load cell member and that extends below the load cell free end.

FIGS. 24A and B schematically illustrate what will happen for embodiments such as device 200, during tapping or other shocks. For example, when the portafilter is tapped/hit on member 212', the member 212' (and associated arm 213', connector 232', and load cell free end 228') move down, typically and quickly to the farther possible extent, which is limited preferably both at the top and bottom of the device, that is, by surfaces 216' and 280'. The force of the tap/impact is shown as shock SH, and the top gap (GT) is closed (eliminated). Likewise, as shown in FIG. 24A, the connector 232' "bottoms out", that is, abuts against surface 280', in response to shock SH, and the bottom gap (GT) is closed (eliminated). This way, the strain placed on the load cell is limited by this closure of one or more gaps (preferably two), so that members of the device move only up to a safe extent that prevents extreme strain on the load cell. In other words, one may see that both gap GB and gap GT allow some downward movement of the assembly comprised of member 212', arm 213', arm-connector 232' and load cell free end 228' (that is, becoming GBW and GTW, for example) but stop surfaces 216' and 280' will limit said downward movement to a safe amount/distance. One may see that one or the other of the two stops (top or bottom) would suffice in certain embodiments, but preferably both are provided in many embodiments.

Figure 25:
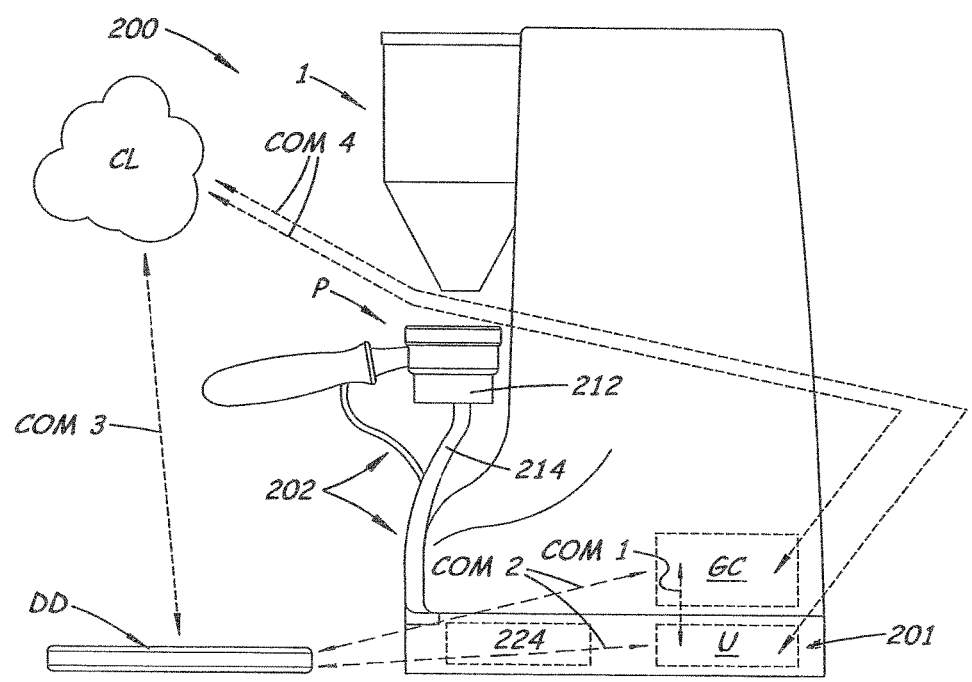
FIG. 25 is a schematic side view of the embodiment of FIGS. 19-21A, showing the grinder installed on the platform device and options for communication between the device, the grinder, a digital hand-held device or other operator control unit, and a cloud or other computer or network system.

FIG. 25 schematically illustrates the assembled platform device 200, except without a housing covering the portafilter support system 202. Base 201 is shown as containing/housing the load cell 224 and associated electronics unit U that receives signals from the load cell. Additionally, unit U may be adapted/linked to communicate COM1 with the grinder controller GC, and/or the unit U and/or grinder controller GC may communicate COM2 with digital device DD such as one that may be held and used by a barista. These communications COM1 and COM2 may be one way, but will be two-way in many embodiments. Alternatively, or in addition, communication COM3 may be conducted between the digital device DD and a separate computer system CL (cloud, network, server, or other computing system not installed on the device 10 or grinder 1), and/or communication COM4 may be conducted between said computer system CL and the grinder control GC and/or the unit U, wherein COM3 and/or COM4 may receive, calculate, report, and/or control the operation of the grinder 1 and/or the device 200. Again, communications COM3 and COM4 may be one way, but typically will be two-way in many embodiments. Communication COM1, 2, 3, and 4 will typically be wireless two-way communication between the barista (via digital device DD) and the device 200, and/or between the device 200 and the grinder 1, and/or between the barista (DD) and a computer system CL that in turn communicates with the grinder 1 and/or the device 200.

It will be understood from this disclosure that tap/shock-caused signals from the load cell to said unit U, and hence to the grinder 1, digital device DD, and/or computer system CL, may occur during tapping and shock, prior to or in-between various weighings of the portafilter and its contents. The software associated with the load cell (in unit U, for example), or provided in other circuitry or control (via software, firmware, hardware, control, and transmitter and receiver elements for communication COM1, COM2, COM3, COM4) provided with the device 200, grinder 1, or computer system CL, may be programmed to recognize, and account for (including invalidate, ignore or eliminate/erase, for example) said tap/shock-caused signals that move the free end of the load cell to the maximum stop(s)/limit(s), and then to recognize and properly process and respond to the signals produced by weighing the portafilter and its contents. Thus, software/programming or other adaptations may be made to "filter" or otherwise prevent the tap/shock-caused signals from the load cell from interfering with the desired grinding and weighing operation and control. Thus, said tapping/shocks will not interfere, with effective and smooth operation and reporting of weights, by sending false or extreme signals to the grinder or other control systems, or to displays/read-outs that the barista will use to monitor and understand the grinding and portafilter-filling processes.

Certain embodiments may therefore be described as:

A portafilter support and weighing platform device, for use with a coffee bean grinder for espresso beverage, the device comprising: a support system having a portafilter basket support portion and a portafilter handle support portion, wherein the support system is adapted to hold the portafilter in a generally horizontal position with the basket underneath the grounds outlet of the grinder, the support system being connected to a free end of a load cell provided in a base of the device; a stationary arm/member extending from the base of the device to underneath at least a portion of the basket support portion, wherein an impact on the basket support portion that corresponds to a load greater than weight of a full (fully-loaded with coffee grounds to the greatest extent that is practical and desirable, for example, fully-loaded with compacted coffee grounds in preparation for use in an espresso machine) portafilter pushes the support system and the free end of the load cell downward until a limit is reached that stops said downward movement to prevent damage to the load cell. Said limit may be the basket support portion abutting down against a portion of the stationary arm, and/or said load cell free end abutting down against a surface of the base or a connector or other member fixed to said free end and extending below said free end abutting against a surface of the base. Said limit may be both of the basket support portion abutting against the stationary arm/member and the load cell free end abutting against a surface of the base. Or, said limit may be both of the basket support portion abutting against the stationary arm/member and a member fixed to said free end and extending below said free end abutting against a surface of the base. The device may be adapted to communicate with the grinder to control the grinder by turning the grinder on and off and/or adapted to communicate with a hand-held digital device adapted to display tare weight and weights of grounds in the portafilter. The device may comprise an electronics unit adapted to receive weight readings from the load cell and communicate with the grinder to control the grinder by turning the grinder on and off. The device may comprise an electronics unit adapted to receive weight readings from the load cell and communicate the weight readings to a hand-held digital device adapted to display, in response to the weight readings, tare weight and weights of grounds in the portafilter.

Certain embodiments may be described as:
A portafilter support and weighing platform device, for use with a coffee bean grinder for espresso beverage, the device comprising:
a support system having a portafilter basket support portion and a portafilter handle support portion, wherein the support system is adapted to hold the portafilter in a generally horizontal position with the basket underneath the grounds outlet of the grinder, the support system being connected to a free end of a load cell provided in a base of the device;
a stationary arm/member extending from the base of the device to underneath at least a portion of the basket support portion;
the device further comprising a cradle pivotally connected to the base and having a rear end to which a fixed end of the load cell is fixed, so that pivoting of the cradle pivots the load cell and also moves the support system connected to the load cell free end;
a switch adapted to actuate pivoting of the cradle to lower the load cell and the basket support portion so that at least a portion of the basket support portion abuts against the stationary arm/member, wherein tapping or impact on the basket support portion does not move the basket support portion any further downward and does not move the load cell free end. The cradle may be pivoted by a cam system having a cam shaft that pushes on one or more portions of the cradle. The cam system may be operated by a solenoid. The solenoid may be actuated by a switch on the portafilter handle support portion, so that resting the portafilter handle on the handle support portion activates the switch to actuate the solenoid. The cradle may comprise, for example, a floor to which the fixed end of the load cell is fixed, and sidewalls upending along right and left sides of the load cell, for example, wherein a cam or solenoid system pushes on at least a portion of the sidewalls to pivot the cradle up and down. The device may be adapted to communicate with the grinder to control the grinder by turning the grinder on and off. The device may be adapted to communicate with the grinder to control the grinder by turning the grinder on and off and/or adapted to communicate with a hand-held digital device adapted to display tare weight and weights of grounds in the portafilter. The device may comprise an electronics unit adapted to receive weight readings from the load cell and communicate with the grinder to control the grinder by turning the grinder on and off. The device may comprise an electronics unit adapted to receive weight readings from the load cell and communicate the weight readings to a hand-held digital device adapted to display, in response to the weight readings, tare weight and weights of grounds in the portafilter.

Certain embodiments may be described as:
A portafilter support and weighing device, for use with a portafilter having a basket and a handle, and with coffee bean grinder having a grounds outlet, the device comprising a base for placement at or near the grinder (including for example, in front of, underneath and upending along, and/or attached to the grinder, wherein in certain but not necessarily all embodiments a portion of the device rests on a table or countertop that the grinder rests on), a portafilter support system upending from the base, and a load cell in the base; wherein the portafilter support system is adapted to hold the portafilter in a generally horizontal position with the basket underneath the grounds outlet of the grinder, the support system is mechanically connected to a free end of the load cell so that the portafilter and any portafilter contents weigh down at least a portion of the support system to strain the load cell for weighing said portafilter and any contents; the device further comprising a protection system for preventing excessive movement (and/or "damaging movement" or "potentially damaging movement") of the free end of the load cell when the support system is impacted by tapping of the portafilter on the device or other shock. For example, said protection system may comprise at least one limit surface provided underneath a portion of the support system that is adapted to prevent said excessive movement. For example, said support system may comprise a basket support portion and said at least one limit comprising a rigid and immovable arm/member extending to near a bottom surface of said basket support portion. For example, said at least one limit may comprise a base surface underneath the free end of the load cell. For example, the device may further comprise a connector that connects the support system to the load cell free end, and said at least one limit may comprise a base surface underneath said connector. "Excessive movement" will be understood by those of skill in the art of load cells, and may be defined, for example, as a movement that causes damage of the load cell, or that may cause damage of the load cell after multiple of said excessive movements over time. Conservatively, said excessive movement may be predetermined/pre-set, in certain embodiments, an amount of movement in the range of 10-30 percent more movement than movement of the free end of the load cell caused by the portafilter fully-loaded with espresso coffee grounds. As discussed above, "fully-loaded with espresso coffee grounds" will be understood to be the greatest extent of filling the portafilter basket that is practical and desirable, for example, fully-loaded with compacted coffee grounds ground to a fineness in preparation for use in an espresso machine. In certain embodiments, said support system comprises a basket support portion and said protection system is adapted to move the basket support portion down against a rigid, immovable arm underneath the basket support portion. For example, said basket support portion may be connected to the load cell free end by a movable arm, and the protection system may be adapted to move said load cell, said moveable arm, and said basket support portion down to a position wherein tapping or other shocks on the basket support portion does not move the load cell further. For example, the load cell may be received in a pivotal cradle, and said protection system may be adapted to pivot the cradle, which causes the moving of said load cell, moveable arm, and basket support portion down to said position wherein tapping or other shocks on the basket support portion does not move the load cell further. In certain embodiments, the device is adapted to communicate with the grinder to control the grinder by turning the grinder on and off. In certain embodiments, the device is adapted (for example, by means of an electronics unit) to receive weight readings from the load cell and to communicate with the grinder to control the grinder by turning the grinder on and off. In certain embodiments, the device is also adapted (for example, by means of an electronics unit) to communicate with a hand-held digital device adapted to display tare weight and weights of grounds in the portafilter during grinding and/or after grinding that are provided by the device. In certain embodiments, the device is also adapted (for example, by means of an electronics unit) to receive input from the hand-held digital device as selected/determined by a barista or management, for example input of a desired amount of grounds for the particulars of the desired beverage preparation (for example, a particular coffee bean, a particular espresso machine, or a particular drink to be prepared) and preferably to signal the electronics unit of the grinder to control grinding to a particular fineness (for example, particle size) and/or weight and/or weight for said particulars of the beverage preparation.

The device may be provided as a retrofit or add-on unit for existing grinders, or as an OEM device included at the time of manufacturing the grinders. For example, the grinder may be set on a low-profile base of the device with the portafilter support system upending along a front of the grinder, to be near the barista.

Although embodiments have been described above with reference to particular means, materials and embodiments, it is to be understood that the invention is not limited to these disclosed particulars, but extends instead to all equivalents within the broad scope of the following claims.

The invention claimed is:

1. A portafilter support and weighing device, for use with a portafilter having a basket and a handle, and with a coffee bean grinder having a grounds outlet, the device comprising:
    a base for placement at or near the grinder,
    a portafilter support system upending from the base, and
    a load cell in the base;
    wherein the portafilter support system is adapted to hold the portafilter in a generally horizontal position with the basket underneath the grounds outlet of the grinder, and
    wherein the portafilter support system is mechanically connected to a free end of the load cell so that the portafilter and any portafilter contents weigh down at least a portion of the support system to strain the load cell for weighing said portafilter and any contents;
    the device further comprising a protection system for preventing excessive movement of the free end of the load cell when the support system is impacted by tapping of the portafilter or other shock,
    wherein said protection system comprises at least one limit surface provided underneath a portion of the portafilter support system that is adapted to prevent said excessive movement.

2. The device of claim 1, wherein said support system comprises a basket support portion and said at least one limit comprises a rigid and immovable member extending to near a bottom surface of said basket support portion.

3. The device of claim 1, wherein said at least one limit comprises a base surface underneath the free end of the load cell.

4. The device of claim 1, further comprising a connector that connects the support system to the load cell free end, and said at least one limit comprises a base surface underneath said connector.

5. The device of claim 1, wherein said excessive movement is an amount of movement in the range of 10-30 percent more movement than movement of the free end of the load cell caused by the portafilter fully-loaded with espresso coffee grounds.

6. The device of claim 1, wherein the support system comprises a basket support portion and said protection system is adapted to move the basket support portion down against a rigid, immovable arm underneath the basket support portion.

7. The device of claim 6, wherein said basket support portion is connected to the load cell free end by a movable arm, and the protection system is adapted to move said load cell, said moveable arm, and said basket support portion down to a position wherein tapping or other shocks on the basket support portion does not move the load cell further.

8. The device as in claim 7, wherein the load cell is received in a pivotal cradle, and said protection system is adapted to pivot the cradle, which causes the moving of said load cell, moveable arm, and basket support portion down to said position wherein tapping or other shocks on the basket support portion does not move the load cell further.

9. A device as in claim 1, wherein the device is adapted to communicate with the grinder to control the grinder by turning the grinder on and off based on weight readings of the load cell.

10. A device as in claim 1, wherein the device is adapted to communicate with a hand-held digital device adapted to display tare weight and weight of grounds in the portafilter, and is adapted to communicate with the grinder to control the grinder by turning the grinder on and off based on said weight of grounds.

11. A device as in claim 10, wherein the device is adapted to receive at least one input from the hand-held digital device, determined by a barista or management, the at least one input selected from a group consisting of a desired amount of grounds and a desired fineness of the grounds.

12. A portafilter support and weighing device, for use with a coffee bean grinder for espresso beverage, the device comprising:
    a support system having a portafilter basket support portion and a portafilter handle support portion, wherein the support system is adapted to hold the portafilter in a generally horizontal position with the basket underneath the grounds outlet of the grinder, the support system being connected to a free end of a load cell provided in a base of the device;
    a stationary arm extending from the base of the device to underneath at least a portion of the basket support portion, wherein an impact on the basket support portion that corresponds to a load greater than weight of a full portafilter pushes the support system and the free end of the load cell downward until a limit is reached that stops said downward movement to prevent damage to the load cell.

13. A device as in claim 12, wherein said limit is said basket support portion abutting down against the stationary arm.

14. A device as in claim 12, wherein said limit is said load cell free end abutting down against a surface of the base.

15. A device as in claim 12, wherein said limit is a connector or other member fixed to said free end and extending below said free end abutting against a surface of the base.

16. A device as in claim 12, wherein said limit is both of the basket support portion abutting against the stationary arm and the load cell free end abutting against a surface of the base.

17. A device as in claim 12, wherein said limit is both of the basket support portion abutting against the stationary arm and a member fixed to said free end and extending below said free end abutting against a surface of the base.

18. A device as in claim 1, wherein the device is adapted to communicate with the grinder to control the grinder by turning the grinder on and off based on weight readings of the load cell.

19. A device as in claim 1, wherein the device is adapted to communicate with a hand-held digital device adapted to display tare weight and weight of grounds in the portafilter, and is adapted to communicate with the grinder to control the grinder by turning the grinder on and off based on said weight of grounds.

20. A device as in claim 10, wherein the device is adapted to receive at least one input from the hand-held digital device, determined by a barista or management, the at least one input selected from a group consisting of a desired amount of grounds and a desired fineness of the grounds.

21. A portafilter support and weighing device, for use with a coffee bean grinder for espresso beverage, the device comprising:
- a support system having a portafilter basket support portion and a portafilter handle support portion, wherein the support system is adapted to hold the portafilter in a generally horizontal position with the basket underneath the grounds outlet of the grinder, the support system being connected to a free end of a load cell provided in a base of the device;
- a stationary arm extending from the base of the device to underneath at least a portion of the basket support portion;
- the device further comprising a cradle pivotally connected to the base and having a rear end to which a fixed end of the load cell is fixed, so that pivoting of the cradle pivots the load cell and moves the support system connected to the load cell free end;
- a switch adapted to actuate pivoting of the cradle to lower the load cell and the basket support portion so that at least a portion of the basket support portion abuts against the stationary arm, wherein tapping or impact on the basket support portion does not move the basket support portion any further downward and does not move the load cell free end.

22. A device as in claim 21, wherein said cradle is pivoted by a cam system having a cam shaft that pushes on one or more portions of the cradle, and wherein the cam system is operated by a solenoid.

23. A device as in claim 22, wherein the solenoid is actuated by a switch on the portafilter handle support portion, so that resting the portafilter handle on the handle support portion activates the switch to actuate the solenoid.

* * * * *